(12) United States Patent
Simmons

(10) Patent No.: US 6,741,911 B2
(45) Date of Patent: May 25, 2004

(54) NATURAL ROBOT CONTROL

(76) Inventor: John Castle Simmons, 7993 Cavershamwood La., Germantown, TN (US) 38138

( * ) Notice: Subject to any disclaimer, the term of this patent is extended or adjusted under 35 U.S.C. 154(b) by 64 days.

(21) Appl. No.: 09/960,294

(22) Filed: Sep. 20, 2001

(65) Prior Publication Data

US 2003/0030397 A1 Feb. 13, 2003

Related U.S. Application Data

(60) Provisional application No. 60/234,191, filed on Sep. 20, 2000.

(51) Int. Cl.$^7$ ............................................. G05B 19/00
(52) U.S. Cl. .................. 700/245; 700/253; 318/568.11; 318/568.12; 318/568.17; 901/23; 901/34; 701/23
(58) Field of Search .................. 700/245, 253; 701/23; 318/568.11, 568.12, 568.17; 901/23, 34

(56) References Cited

U.S. PATENT DOCUMENTS

| | | | |
|---|---|---|---|
| 5,105,367 A | 4/1992 | Tsuchihashi et al. | |
| 5,266,875 A | 11/1993 | Slotine et al. | |
| 5,382,885 A | 1/1995 | Salcudean et al. | |
| 5,587,634 A | 12/1996 | Desai et al. | |
| 6,532,400 B1 * | 3/2003 | Jacobs | 700/245 |
| 2002/0094919 A1 * | 7/2002 | Rennex et al. | 482/124 |

OTHER PUBLICATIONS

Littman, Research interests of Micheal G. Littman, 1998, Internet, pp. 1–2.*

* cited by examiner

*Primary Examiner*—William A. Cuchlinski, Jr.
*Assistant Examiner*—McDieunel Marc

(57) ABSTRACT

An apparatus and process for controlling a remote robot responsive to the integrated sensory perceptions, natural body movements, inertia and gravitation of an operator/user who is himself responding to a three dimensional virtual world of visual and sensory conditions responsive to the environment at the remote site where the robot is operating. The user requires no training, special commands or devices to direct the robot because the user has the perception of actually being at the remote location, handling remote objects he sees and feels in his hands, walking, climbing, viewing and feeling the remote world.

68 Claims, 14 Drawing Sheets

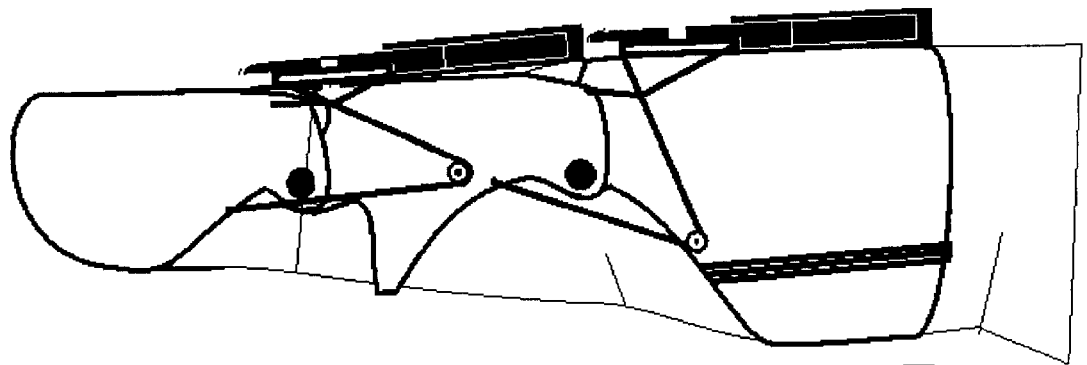
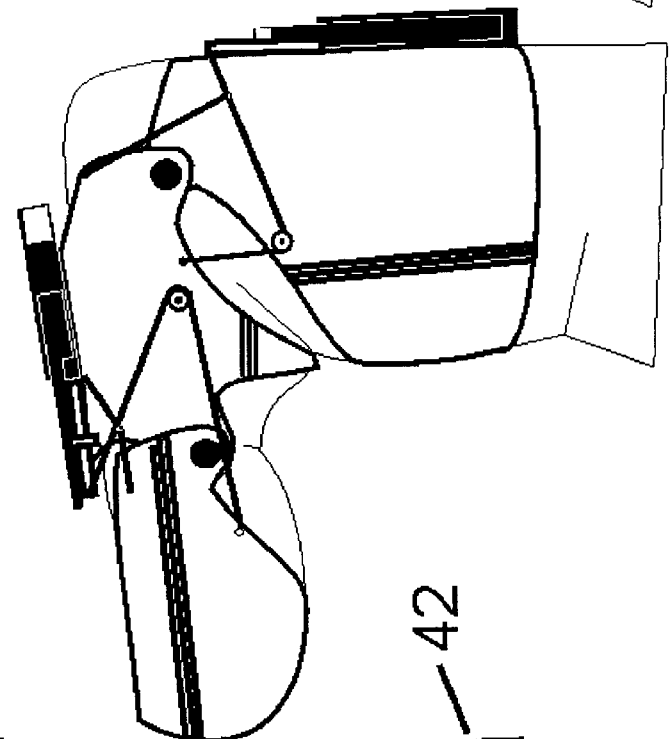
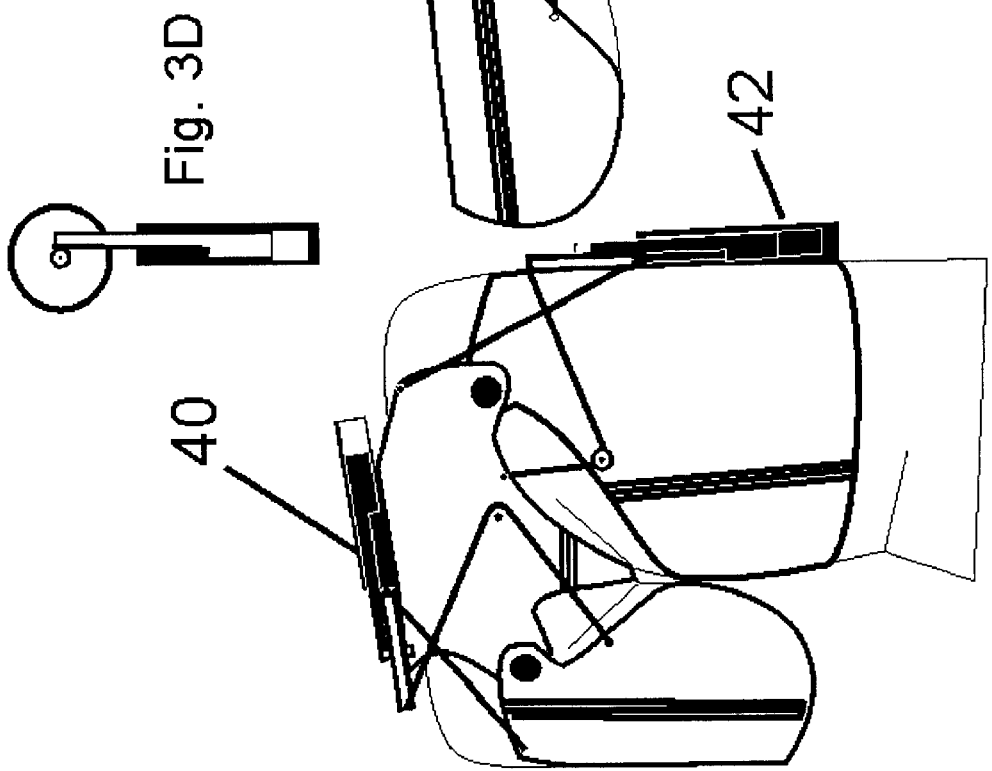
Fig. 3C
Fig. 3B
Fig. 3D
Fig. 3A

NATURAL ROBOT CONTROL

This application claims the benefit of Provisional application Ser. No. 60/234,191, filed Sep. 20, 2000.

BACKGROUND OF THE INVENTION

Throughout history, man has always wanted to be somewhere he is not. Even today, people struggle with the problems that can only be solved by "being there" even when "being there" involves substantial danger (ex: bomb squads) or great inconvenience (travel). Existing robotics equipment and processes provide means for a user to direct the actions of remote actuators. Salcudean et al U.S. Pat. No. 5,382,885 issued January 1995 discloses a local tool that can be manipulated causing an operatively identical remote tool such as a scalpel to follow suit additionally providing responsive and even leveraged pressure back on the tool the user grasps in his hand. Response feedback is limited to the moment of the tool itself, not the user's fingers, hand, wrist, etc. Slotine et al U.S. Pat. No. 5,266,875 issued May 1991 provides feedback in a joystick and additionally provides a transmission delay effect softening process the latter of which can be optionally applicable to ancillary features of the current invention. Tsuchibashi U.S. Pat. No. 5,105,367 issued April 1992 directs a remote arm with a joystick and also provides a camera at the remote location providing feedback to a video screen in front of the user. Desai U.S. Pat. No. 5,587,634 issued December 1996 discloses a body actuated control apparatus and system for commercial sewing machines wherein the user pushes a lever with the knee or leg that directs nearby equipment that is visually observable by the user.

SUMMARY OF THE INVENTION

The current invention allows a human operator to perform delicate or indelicate tasks with great dexterity remotely with broad multiple and synchronized simultaneous sensory interaction as if the user were actually there. This includes the accurate, full-body interactive, real time perceptions and control of weight, distance, inner ear balance, motion/inertia, speed, pressure, vibration, impact, resistance to action, sound and a true, position responsive visual interface as if his body were actually in the remote location. Unlike the existing screen displays that reflect a camera view of a remote location dislocated from the actual perspective of the user's body attitude or user action, the visual perspective of the current invention is responsive to the exact pitch, roll and yaw of the user's head and body as well as to the relative velocity of the full body. Thus the user actually looks down where his hands really are, sees hands and remote objects in them just as if he were there. Further, the user is not holding a local tool that is interfaced to a singular remote tool that emulates the motion of the local tool but, instead, the local user is actually holding empty air despite the fact that he sees and feels the weight, resistance and vibration of the tool in his hand. Guided naturally by visual, sound and other sensory interaction, the user's hands, arms and other limbs are acting in the remote world using any tool that can be found at the remote site or just using the hands and other body parts alone. Thus the current invention is not limited to special tools, limited work areas, narrow visual perspective or the narrow scope of remote capabilities of existing technologies. Additionally, the current invention provides the user the ability to feel what he is doing and not just resistance pressure but full 360x360 degree inertial and gravitational feedback. This allows him to apply appropriate 3 dimensionally precise pressure (ex: in surgery where the remote tool is a scalpel), weight, etc. Further, the current invention is scalable allowing the remote robot to be very large or small while still providing realistic and appropriate feedback to the normally sized operating user. The user will have the very natural perception of being whatever size the remote equipment requires. Further, unlike existing robotic control technologies, the user is not only controlling but is uniquely and in every part of his body, himself physically controlled, even forced, to exist within the real conditions and constraints of a distant environment even as he simultaneously controls the elements of that distant environment.

Thus the objects of the current invention include the provision of coordinated user sensory support and enforced fidelity of synchronized positions while directing the efforts of the remote robot as easily as if the user was in the robot's place. As an example of these objects, the local user sees and feels right in front of him not only the right hand precisely where his right hand actually is but he also sees and feels, for example, a scalpel grasped just tightly enough in it and the other hand squeezing a human heart just enough to distend the surface but not enough to injure a valve.

It is another object of the current invention to provide a remote tool control apparatus and process that is not limited to a singular tool or a controlled work area. It can be used with any tool of any shape or size that the user is capable of directing with any and all parts of his body which allows the user to move around the object working around a full 360 degrees by 360 degrees and can be moved any distance from the original point of contact as required by the task . . . . In one hand the surgeon feels the texture, stiffness, slipperiness, resistance to squeezing, the pulse as the heart pumps and the weight of the heart just as he feels in the other hand the resistance and vibration of the scalpel as it makes an incision and encounters more resistance as it goes deeper. He appropriately responds to a sudden resistance with just enough additional force to overcome the scalpel's resistance but not enough to puncture below or overextend the cut. If he needs to follow the patient who is rolled to another floor in another building and use different tools at that new location, he simply walks, following the remote patient to the new building, orients himself to accommodate the new patient orientation, location and equipment, and proceeds to work.

It is anther object of the current invention to provide physical support and interaction for the user exactly responsive to actual objects at the remote site. While the above surgery is going on and the user is intensely working with the scalpel in one hand, a living heart in the other hand and both supported by a rolling tray support upon which the surgeon is leaning heavily upon for support and stability, someone standing next to the user would see the user with nothing in his hands and leaning upon nothing. No heart, no scalpel and no support tray. But the user sees and feels an object in his hand, feels the weight and shape of it and can manipulate the phantom object naturally and easily even though the object he sees, feels and changes and the other objects upon which he rests or climbs upon are actually many miles away. Whatever the local user does to that remote phantom item that is held and felt in his remote hand will be done at the remote location. Thus the current invention requires little or no training of the user to perform intricate remote tasks because there are no device control techniques to learn. The user simply perceives that he is there and his normal senses support that illusion.

It is another object of the current invention to provide an apparatus and process for the user to "travel" (direct the remote) over any distance and over any terrain without any need for laboratory conditions or controlled terrain at the remote and without the need for "travel distance" or props of any kind at the user's location. The user can travel any distance through the remote while locally remaining in a very small space.

It is another object of the current invention to provide an apparatus and process allowing the user to be unencumbered in what he can do and unlimited in what dimensions he can move while directing the remote robotic equipment to perform any action a normal person can do. Thus the user can jump over a log or perform any number of somersaults without worrying about becoming tangled up in equipment.

It is another object of the current invention to provide, without modifications to the local equipment, the ability to direct remote equipment that is proportionately larger for heavy industrial or other applications where power is an issue. Also, using the "Microman" option, the user directs, responds to and is constrained to react naturally in a much smaller environment. Thus the user can stroll into a mouse hole or into delicate equipment to make repairs. Or the user can direct very large robotic responses for heavy industrial work with the natural feeling of being the size of the remote equipment.

It is another object of the current invention to provide the user with further and natural extended sensory perception including body acceleration/inertia, weight of his own limbs in any number of positions, balance (with full inner ear response) and all the natural responses relative to the remote robotic equipment's pitch, roll and change in yaw.

It is another object of the current invention to provide a means for complete body coordinated responses to remote conditions allowing the user to easily control the myriad of rapidly changing remote environmental conditions with the natural, yet extremely complex to recreate or guide with direction devices, reactions to remote conditions. Impact, for example, of a forward outstretched arm encountering a wall not only extends the user's fingers backwards, tilts the wrist, bends the arm, etc. but also causes the waist to give and the head to move down and forward providing the user not only the sensory perception of the remote robotic equipment's condition but the precise operational perspective (dimensionally responsive visual feedback, balance, etc.) to support the quick and natural response remote control maintenance that is lacking in prior art.

It is another object of the current invention to enforce complete body synchronization with the remote equipment in a manner that, even while allowing the user sensitive directive control, allows the user to feel and respond precisely to remote physical conditions, climb a locally non-existent mountain (it's at the remote site), hang from a locally non-existent tree limb or lie down horizontally on a non-existent bed enjoying the remote bed's exact body support even though there is nothing below the user.

It is another object of the current invention to provide a simple mechanism with programmatic control that allows the equipment itself and, optionally, the user himself, to appear weightless and thus able, for example, to extend an arm indefinitely without tiring.

It is another object of the current invention to provide a user equipment design that can be automatically and/or programmatically adjustable to the body of different users rather than requiring retooling each time a different person uses the equipment. It is another object of the current invention to provide a design means that allows the remote robotic equipment to adjust manually or programmatically to match the body length and weight distribution of the human user.

It is a further object of the current invention to provide a unique exoskeletal design that provides natural response without the requirement of overly cumbersome devices clamped on the user. It is also an object of this invention to provide an exoskeletal control design that simultaneously measures and enforces extremely complex body attitude combinations with extraordinarily minimal data transmission or processing allowing smooth response cycles.

It is also an object of the current invention to, in addition to communicating to the user physical impact and regional vibration through the responsive and synchronized joint control apparatus, provide the user a sense of touch and vibration allowing the user to better "feel" the remote environment.

It is another object of the current invention to provide a means for allowing the user equipment to be effectively and even automatically adjustable so that it effectively matches the desired alignment, tightness, looseness, etc. of every joint in the robot even as the equipment on both ends tightens or loosens with wear over time.

It is another object of the current invention to provide 3-dimensional, 360 degree by 360 degree relative sound response providing the user with direction and amplitude feedback precisely responsive to the attitude of the remote equipment's relative 3 dimensional attitude towards the sound sources. In addition to the larger effects, this can include even the refinements of outer ear shape and position as sounds from different directions are focused by the oval sound-shell of the outer ear.

It is another object of the current invention to provide an apparatus and process allowing the user to operate with all the abilities as described above but in a completely virtual environment rather than directing a remote physical set of robotics equipment. This includes the user swinging on virtual tree limbs, shaping and tooling virtual objects for later automated production and testing equipment that has been designed in and exists only in a virtual environment like the one documented in the patent application "Rapid Setup Universal Simulator Predicting Complex Physical Outcomes".

It is also an object of the current invention to provide a means to rapidly set up a simulated environment superior to existing simulator sets that require massive custom programming for each simulated environment, extensive physical sets, motorized seats, surround screens, custom designed furniture and furnishings. The simulation environment can be quickly assembled virtually by "dragging and dropping" objects from from 3-D CAD drawings or previous simulations as described in the patent "Rapid Setup Universal Simulator Predicting Complex Physical Outcomes" and the user (and any number of other simultaneous users) can immediately walk, climb, operate and test equipment, etc. in a highly complex simulator that is completely virtual.

Although these abilities have great application to numerous and pressing needs in manufacturing, engineering design and defense, they have previously not been possible without the new elements in the current invention.

BRIEF DESCRIPTION OF THE DRAWINGS

There are shown in the drawings some of the embodiments of the current invention. It should be understood that these embodiments are exemplary and not limiting. Reference should also be made to the appended claims in order to assess the scope of the invention and its reasonable equivalents. In the drawings.

FIGS. 3A, 3B, and 3C provide a side view of a finger in various degrees of extension assisted by a pair of actuators 40 and 42.

DESCRIPTION OF THE PREFERRED EMBODIMENTS:

The technology of the current invention can control any or all body joints and limbs. Examples are given here of sample joints and limbs to disclose the underlying process for effecting these processes. At a local site, a user wears equipment (some example embodiments are shown in FIGS. 1–13) designed to sense the position of, apply response pressure and programmatically reposition each of the local user's joints based on conditions and actions at a remote site as well as to automatically direct actions at the remote site responsive to user action.

At the remote site, robotics with effectively identical or consistently relative (to scale) build characteristics to the user also has similar controls. The length and balance of the remote's limbs are adjustable by lockable telescoping, adjustable length "bones" and threaded or otherwise linearly movable weights along the length of the "bones" for balance emulation, etc.). In an extended embodiment, the limb length and weight distribution of the remote and the local can even be caused to be adjusted automatically as the local user goes through a series of synchronizing exercises under controlled conditions to identify and correct differences between the remote body and the local. During this process the length of the remotes "bones" and the linear location of weights along the "bones" are adjusted (retracted/extended) to become effectively identical to the user's. It will be interesting to note, as will be seen later, that it is less important for the weight of the remote equipment to be identical to the local equipment as it is that the two sets of weights be linearly proportional.

Figure 1:
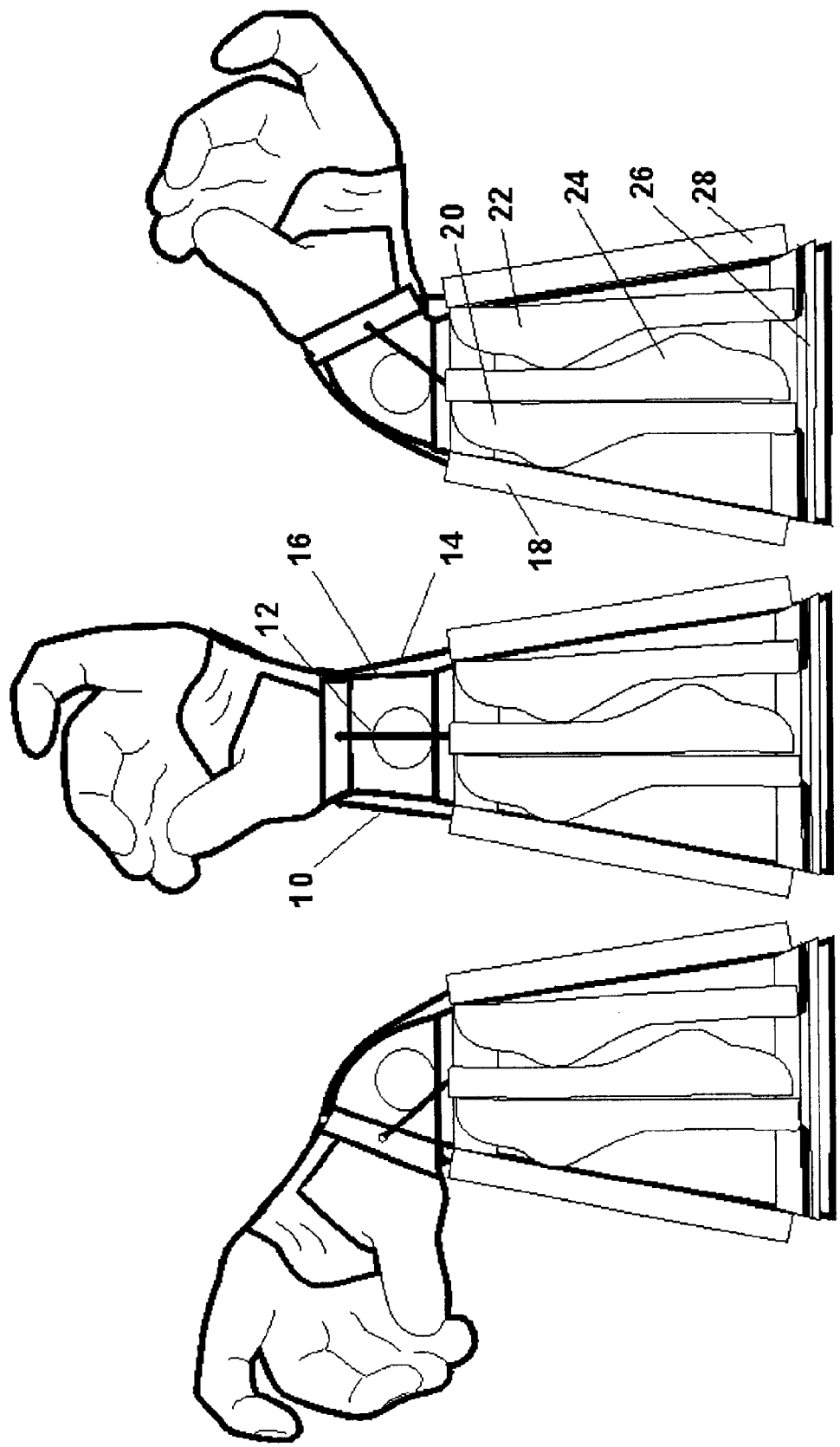
FIG. 1 is a side view of a hand and wrist assisted by an assembly of actuators on a lightweight supportive frame around the wrist.
Figure 2:
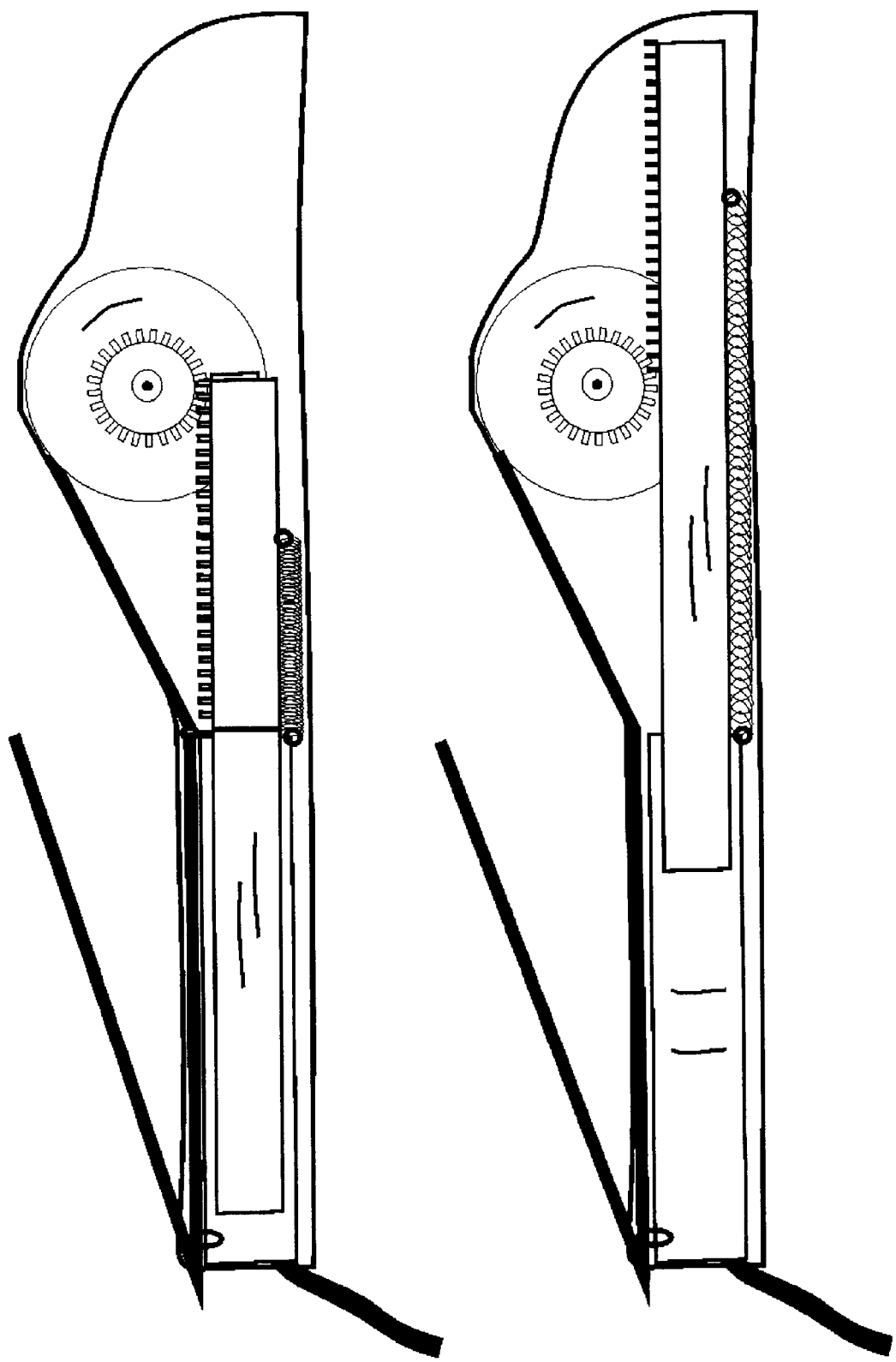
FIG. 2 is a cutaway view of one form of a hydraulic-based tendon-pulling actuator.
Figure 4A:
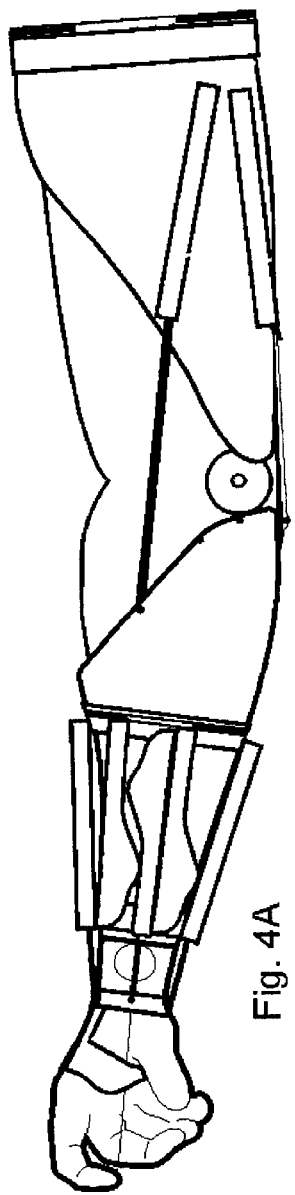
FIGS. 4A, 4B, 4C, and 4D show views of an arm wearing some of the assistive elements.
Figure 4D:
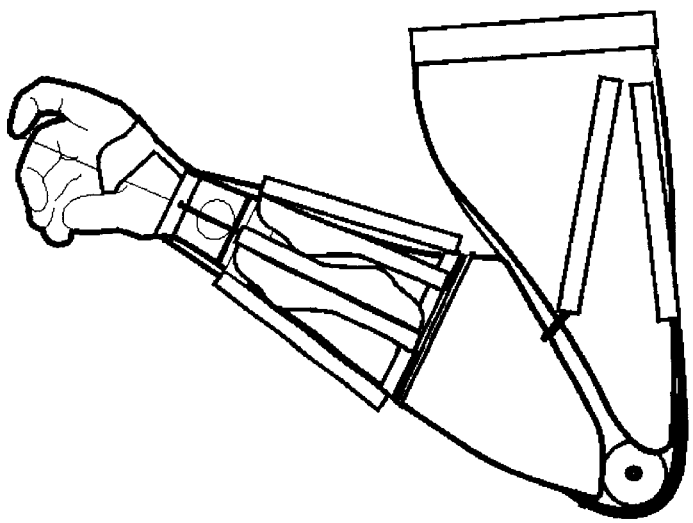
Figure 4C:
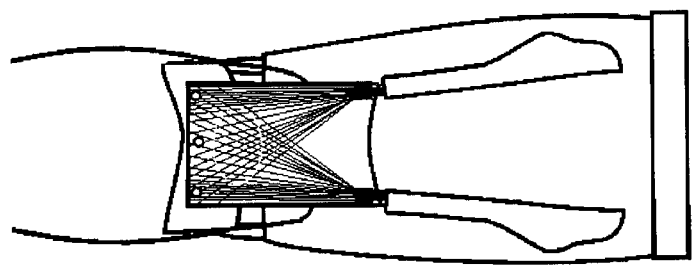
Figure 4B:
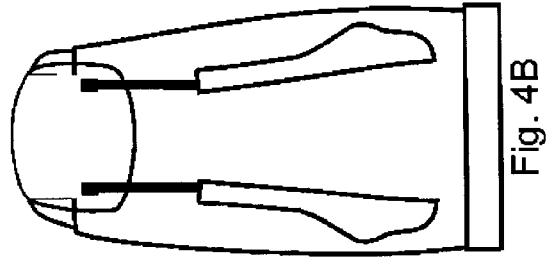

Whether adjusted manually or by an automatic process, for the purposes of this explanation of the current invention, the remote and the local "bodies" are considered to be effectively identical (or at least proportional) in size, weight and balance. In fact, the same drawings are used for the human local user and the remote robot to make the point that, in the simplest embodiment to communicate, they are effectively identical except that the human has living bones and joints while the robot has mechanical "bones" and joints. The robot's controls can be effected with the same external actuators shown for the local human user. In some embodiments of the current invention, the robot may have humanlike joints or axle, ball and socket, joints in the same location and effectively operationally identical to the user's joints. For example, the ball socket 12 shown for the wrist in FIG. 1 is overlaid on the image both to illustrate the effective position and joint functionality of the human wrist when viewed as local user apparatus and as an illustration of one embodiment of the mechanical joints of the remote robot's wrist.

Obviously, a nylon combination internal remote wrist joint bound by artificial sinews more like the human wrist has some design advantage and certainly simplifies the mathematics and physical comparisons necessary to explain the process of the current invention. However, there will be many obvious application embodiments where the internal joint structure of the remote robotics equipment will be reduced to more typical mechanical joints and actuators with virtually identical net operability at the remote end. Where, for example, a ball joint permits more range than a corresponding human joint, the range on the remote can simply be programmatically limited to the normal human range at the remote. Further, fully internally actuated robotics like those common to robotics applications will also be configured for the remote. In those cases, while the local user's assembly may be completely unchanged, the remote robot can have more traditional robotic frames and actuator assemblies. Fortunately, it will be obvious to any skilled technician how to adapt internally actuated robotics at the remote to emulate the well defined responses described herein for the more human-like externally actuated robotics shown in the illustrations.

Having the same external actuator assembly on the user and the robot as described here has the advantages of being an effective means as well as being an ideal testing environment for development and a simpler configuration to explain as we attempt to communicate the mathematics, geometry, computer communications and logic controlling the balanced relationship between the joint assembly on the local end and the joint assembly on the remote end. Thus, when an actuator at the local end moves a joint 7 degrees, you can expect an essentially identical (although sometimes reversed as described below) actuator response at the remote end rather than having to calculate and visualize a complex conversion between differing geometries and equipment at the local and remote. Thus this example embodiment of the current invention will describe the external actuators, limb control hardware and body limbs and joints as being operatively identical at the local and remote. The current invention allows for any number of additional external actuators to be added to the control assemblies described here.

There are many acceptable methods of achieving joint angles. There are numerous commercial actuators from stepper motors to artificial hydraulic muscles that contract when inflated to effect changes and provide support to these joint angles. These can all be programmatically controlled to work in the design of the current invention. In these examples for the sake of example, a tendon based, offsetting pull only system using gas or fluid pressure has been described. For a better description of the tendon actuators used in this example embodiment, see FIG. 2. The tendon, or cable, 30 is "pulled" as the hydraulic piston causes the gear to rotate. For an example of their use providing offsetting tension to achieve human-like joint control, see FIGS. 1, 3 and 4.

For visual response the user wears a wrap around video display according to existing art providing real time display reflective of the environment as seen at the remote location. The remote has cameras (stereoscopic vision is the preferred embodiment) placed in the eye sockets of a lifelike remote face which are aligned to the perspective of the user's eyes. The attitudes of the user's and remote's bodies and limbs are monitored using attitude, accelerometer, positional and motion sensors similarly located on both the user and the remote. While geomagnetic sensors were originally selected for this purpose, Global Positioning Systems (GPS) based on satellite data and numerous other positional, velocity and attitude sensors are becoming more precise and can also be used. Since all the body joints are in sync between the local user and the remote computer, the general attitude sensing equipment could be placed almost anywhere on the body measuring it's vertical or tilted position. The other joints, all in sync with the area of the body whose attitudes and position is thus measured, will thus be in proper position. The primary attitude and acceleration sensors in this sample embodiment of the current invention are on the head and the lower back just below the waist. Attitude measuring at both the remote and the local provides the means to synchronize not only the relative position of every local joint to every remote joint but to be sure they are both aligned properly with gravitational forces and inertial motion vectors. This provides one of the underlying elements that allows true inner ear balancing of the remote by the local user.

Summary of the Unique Processes Behind the Current Invention

The local human user wears equipment connected to a first computer that is operatively and remotely connected to a second computer that is operatively connected to, and typically contained in, a robot. Others have developed technologies for sensing movement information from body worn sensors and transmitting this movement information to computers. They are all applicable to the current invention for the purpose of sensing motions and other kinetic characteristics of the human user at a first (local) site and communicating those key control measures to a first computer also at the local site.

(While the process can be effected in a cyclical series of phases or in a more parallel, simultaneous means, the cyclical series of phases is referenced first here below since the parallel means is better understood after grasping the concepts of the cyclical phases. However, the unique claims of the current invention as listed just below are not limited to a cyclical process.)

The current invention then, after initial user body motion information, etc. sensed at the first (local) site has been relayed to the second computing means at the remote site, adds several new and unique functionalities:

1. The second computing means at the remote site senses any shortfall in the distance traveled at the second site and returns this as actionable data to the first computing means at the local site.
2. The second computing means also measures and reports to the first computing means any joint, and thus body, position not in perfect alignment with the local user at the first site including an overshot at the remote of demanded motion caused by an unplanned remote external condition in a means supportive of controlled response.
3. The computing means at the second site measures and sends attitude data (such as pitch, roll, yaw, velocity, etc.) and returns this to the remote site.
4. The second computing means also monitors the exact pressure required at the second site to attain and hold that current position achieved and then communicates that information from the second computer to the first computer.
5. The second computing means can effect adaptable force between cycles to maintain a position demanded by the local (first) computing means.
6. The remote also measures and sends an array of attitude and motion data to the local computer where it is used to effect these same attitudinal and inertial conditions on the local user.
7. The current invention also includes mechanical means to not only create responsive feelings of resistive pressure to the local user but also to effectively conform the local user's entire body into exact positions and to effect precise motions proactively directed by the local computer responsive to remote conditions. To effect this user direction and empowerment, the current invention includes a complete set of actuators not combined into the limbs of a robot but combined into an external assembly that effectively controls and guides the motions of the user at the local site even as he fluidly guides the remote robotics equipment.
8. The computer software at the local site then automatically assures, using the hardware means above, that every one of the limbs of the user at the local site is precisely in simultaneous alignment with the robotics at the remote site or that it is appropriately ahead of the remote depending on the circumstances of the current action.
9. The current invention, using only the joint control apparatus, also communicates coordinated full-body impact shock appropriately to the user precisely causing its effect on the user to reflect remote conditions so that the user's response is natural and appropriate. However, the current invention programmatically "governs" the maximum shock communicated for the safety of the user.
10. The current invention also collects delicate sensory information at the remote including touch and vibration. Using an array of tiny sensors at the remote capturing pressure and vibration on fingertips and as many other areas as desired, these measurements, when received at the local computer, are converted to, at the relative position on the local user, both vibration and pressure using, in this embodiment, an array of voice coil points effecting pressure and carrying vibration data as well to the user where that pressure and vibration provide extended touch sensitivity of remote conditions to the local user.
11. Additionally, the current invention then uniquely allows the user to exert himself (or respond by not exerting himself) against the phantom resistant object's pressure on the user's joints and the new positions are then communicated to the second site where the remote computer directs the remote actuators to obey the user's instructions which are in response to the exact conditions at the remote site thus continuing the cycle. This cycle continues to the extent that a user who is attempting to lift a 100 pound bar bell at the remote site will feel the weight of 100 pounds.
12. Additionally, the current invention allows the user to choose to have a relative response rather than an actual one allowing 100 pounds to feel like 10 pounds or 1 oz. to feel like 10 pounds which may also reflect the options allowing the remote robot to be tiny or gigantic. This makes the user able to fluidly and naturally direct a tiny robot capable of running into a mouse hole or a large one capable of great strength. In either case, the virtual world the user perceives is perfectly proportional to his remote "size".

13. Additionally, the current invention effectively superimposes the remote visual image over the local user's perception of local space. The local user wears a wrap around video display or a holographic display over his eyes either of which reflects the stereo image captured by the "eyes" of the remote robot. A simple exercise between the user and the remote can be used to fine tune the calibration between sight position and actual position with the correction being in the form of either hardware position adjustment or programmatic offset adjustment to put the two worlds in precise sync. However, since the local user and the robot are completely synchronized throughout the body, the image he sees directly in front of him is, effectively, his own hand, arms, etc. holding and manipulating objects that appear to be in his hands but are responsive to anything he does to them even though the actual held object is miles away. The hands he actually sees are the robot's but their virtual placement is precisely aligned with his actual spatial reality such that all his learned motor responses, working skills and coordination can be used instantly to guide remote operations.

14. Additionally and uniquely the full body joint controls and the simultaneous nature of its joint control and the enforced positioning precisely reflective of the remote effectively places the user's body leaning forward, backwards, twisting, rolling, spinning, etc. exactly as the remote is. This provides the local user with full body sensing of motion, weight and genuine balance using his own inner ear for a level of realism that allows him to easily keep the remote robot standing up and in perfect balance even in complicated operations simply by keeping himself in perfect balance in response to stairs, hills and even collisions that all exist remotely.

15. A virtual landscape control device that allows the local user, as he "exists" in a virtual picture of a remote location where the robot is, to not only manipulate things, stand, bend, hang from things, and walk, etc. but additionally to climb any number of nonexistent stairs (or mountains), turn somersaults or hang upside down (upon nothing locally) without ever leaving a small room. In his virtual world he may be standing on a mountain top. In the real world, the mountaintop he is standing doesn't exist though he feels the rocks holding him up and the wind shaking his body.

16. <(I)>> The current invention creates a functional link that is directed by two independently operating computer means (either 2 processors as described here or two processes directed by a single processor) in "agreeable opposition" to the demands of the other. Each, while making demands upon the other, makes decisions based upon constraints local to itself. Thus, while data from the first computing means demands a response by the second computing means to engage actuators that should move the remote robot in a manner precisely corresponding to that sensed at the first site as directed by the first computing means thus providing motion, the second computing means can make independent, remote condition driven decisions (as described below).

17. The current invention also provides hydraulically assisted, conditional but effortless fluidity of motion against both the weight of the equipment and the natural resistance of the joint control system leaving the impression to the user of wearing nothing. In response to pressure from the user on the first sensing means in any direction not currently programmatically opposed by resistance as communicated from the second means, the local user directive actuation devices provide assistance to the user's desired motion against inherent resistance in three dimensions via the unique actuator assemblies similar in effect to the fluid direction support of power steering to a driver. However, unlike power steering, if there is a resistant pressure at the remote, any user motion assistance is programmatically reduced by that resistance amount so that the user feels the appropriate relative remote resistance even as he feels no resistance from the equipment itself.

In its simplest form, the multi-stepped cycle can be viewed as beginning with a user movement communicated to a nearby computer and, finally, after multiple other steps, ending with the user "feeling" the remote environment and being placed in sync with it. The cycle then repeats itself starting over as the user moves again. By keeping this cycle length short, adjustments to movement are kept very small providing smooth, responsive motion.

There is, of course, a great deal of unique design engineering required to make these new things happen. Each body joint both at the first (user) site and the second (remote) site is precisely monitored and controlled. Also, an array of body control devices, sensors and controls at both the local and remote site manage the position of every joint and capture data for transmission to the corresponding site.

To explain the foundational technology of the current invention and how it delivers this functionality, we will start with the movement of a single joint.

EXAMPLE

Consider a first apparatus located at the local site. Here, a human user wears sensory and body control equipment which is attached to a computer. Some examples of the sensory and body control equipment used at the local site is illustrated in FIGS. 1 through 4 and 7 through 14. The local site computer is in communication with a computer at a second site, the remote site, over commonly understood communications means. The distance between the local and remote site is limited only by the range and speed of the communications means chosen. Connected to the computer at the remote site is an array of actuator control devices responding to instructions from the remote site computer and thereby controlling the actuators on a robot at this remote site. The robot also, in addition to the normal actuators, also contains sensors of movement and pressure which provide data that is then communicated back to the remote site computer. In this described embodiment, we will locate all of the remote site's equipment, including radio equipment (when that is the communications means chosen) within the robot itself.

The process can be described as being performed in 4 phases. As mentioned above, a more parallel process is equally applicable and described further below.

I Local site equipment calculates and sends key control measurements (KCM's) reflecting its local user's positions, etc. to the remote equipment.

II Remote attempts to match the local conditions such as: joint angles, etc. of local motion.

III Remote calculates and returns values to user site indicating remote's amount of success (or graduated amount of failure) and new remote KCM's including the conditions required to maintain the position that was achieved.

IV User site hardware emulates remote angles and pressures, etc. calculating values for the next cycling of phase 1.

In the subsequent phase I that follows phase IV, the user will feel the weight, impact, off balance condition and spatial position of the remote and may, if resisted by the remote environment, choose to increase his effort to overpower the phantom resistance (which is very real at the remote) or back off and be "pushed" further back by the same resistance. The two processing means, agreeable opposition control process administered by the independently thinking separate processes (if not processors) allows both the user to move and the remote to deal with forces and conditions at it's remote site throughout and during all the cycles.

We will begin this example session with the local site sending key control measures (KCM's) to the remote. KCM's, which exist for both local site and remote, can include, along with other data:
1. Degree positions of every local site joint (or at least the ones that changed since the previous cycle).
2. The pressure currently being exerted upon those joints. At the local this can be the resistance overcome to achieve the motion which can be calculated using the resistant pressure being exerted on the joint and the time over which the change was made. However, in this example embodiment of the current invention, the local will not bother to send the non-mandatory local pressure information to the remote but the user will feel it nonetheless. The pressure sent from the remote to the local is simply the pressure required to hold the current attained position.
3. Attitude data including pitch, roll, velocity and literal or comparative yaw with respect to a point in space. Multiple groups of these measurements may be sent from various body parts. However, one of the major strengths of the intra-cycle all-joint synchronization process, is that the local and remote are proactively controlled by processing means to be so aligned that only one set of attitude and overall body motion sensors are required and that sensor location can be on any part of the body.
4. Touch and vibration data from skin contact points.
5. Speed of motion for each joint as motion occurred in the previous cycle and other control information (calculated rather than transmitted in this example embodiment).
6. Time of measurement and/or length of period since a previous action for a joint.
7. Other optional information. 5 and 6 would most typically be used when the desired cycle rate is slow or the communications distance is great requiring special software at the remote to support continued action while awaiting the next communications packet.
8. The visual and audio signals are ordinarily sent on separate communications channels.

In this sample embodiment of the current invention it will be shown that even a minimal transmission of data can effect the basic functions of the current invention. Thus, in this first example, the local computer will send only the first of the above 8 categories of KCM's, the degree positions, to the remote computer and the remote will send the local only the first three, degree (or actuator position), pressure and attitude measurements.

KCM's going either direction may also be in the form of pre-calculated robotics/actuator commands instead of the simple values for degree, direction, pounds of pressure, etc. In this example, actual actuator position (degree of retraction/extension) and pressure values are sent. Each end of this communication emulates some or all of these values such that the two bodies are in sync.

Illustration of a Simple, Two Dimensional Joint Control:

As an example of the basic four phase per cycle process, here we follow the bending of a single joint to pick up a small remote weight throughout a single cycle. Of course, each such joint could effect its own phased cycles independent of other joints as changes occur to that joint. However, in this example embodiment we will describe the cycles as inclusive of all joints, i.e. at least all the joints whose KCM's have changed since the last cycle, and the joints will respond to feedback as a group essentially at once.

Phase I; Local site: The local site computer stores the KCM's based on current joint positions to memory and transmits them to the remote computer while also storing the time, i.e. the time of last measurement, to memory registers in the local site computer.

| Sample data format A: | | | |
|---|---|---|---|
| Joint number | Angle | Pressure | Elapsed Time |
| MDI | 0 | | |
| AGO | 1 | | |
| DEL | 2 | | |
| 0001 | 14.065 | | |
| 0002 | 107.011 | | |
| 0003 | 73.070 | | |
| ... | | | |
| ... | | | |

The first 3 lines transmitted in the sample above illustrate some of the system parameter passing that optionally goes on between the host and the remote as needs arise. Here the Joint number and Angle fields are used in the header (unique information sent before the main body of data) to supply certain other control information. For example, the MDI and 0.0 on the first line communicates to the remote that the local has determined that the Minimum Delay Increment is, for this cycle and until further notice, 0.0 seconds.

The MDI is an optionally used Minimum Delay Increment which fixes the time it takes to finish one complete 4 phase cycle and will, for example, prevent the equipment from over-polling when speed is not maximized. In other words, at the end of phase IV, the local would wait until that minimum time period (MDI) had elapsed for the cycle before proceeding to the next phase I. Also, for certain synchronized functions, particularly where large distances cause slow transmission, each end may optionally force a certain duration to a cycle by entering a delay thus wasting time after completing adjustments until the MDI has elapsed. Here the MDI is disabled by setting it to 0.

The AGO with a value of 1 sent in the second line is another transmitted system parameter telling the remote which Aggressiveness Option to use in moving remote joints to the desired position. Here, the first is chosen from the aggressiveness options explained further below.

The DEL and 2 above tell the remote that the DELicacy level is 2. At any point in time it is useful for the remote to have a cap on the amount of additional (increased) pressure per cycle that it can exert for a given joint. Allowing too quick a response could actually allow a lethal blow at the remote to injure the local user. This value can be sent with every record in the transmission shown above for every joint (as it is below in documentation for phase IV for only one joint) but sending a pressure cap amount with every joint command can slow down transmissions. Thus, this value can be considered as current until further notice and the amount of data transmitted can be reduced, as it has been here, by keeping a table of pressure levels for each joint like the sample shown below at the remote which may be modified from the local. A sample data format for the stored delicacy options is shown below:

| | Sample Data Format B. | | |
|---|---|---|---|
| | Delicacy Levels | | |
| Joint Number | Level 1 | Level 2 | Level 3 |
| 1 | .50 | 1.55 | 2.30 |
| 2 | 3.00 | 9.00 | 12.10 |
| 3 | 5.00 | 7.30 | 14.00 |

Thus, if delicacy level 2 was selected, joint 0001 would have a pressure cap of 1.55 psi while joint 0002 would have a pressure cap of nine pounds, etc. Thus a single delicacy level can communicate to the remote an entire list of default pressure cap levels for every joint.

The rest of the transmission shown in Sample Data Format A above is kinetic information relative to each local joint. Here joints 0001, 0002 and 0003 are displayed but, since this explanation is limited to one joint, only joint number 1 will be considered.

It is not necessary to send any of the header information repeatedly with each transmission. The settings stay in force until they are replaced or overridden with subsequent parameter transmissions.

The angle amount in the Angle field is not necessarily a geometric angle. For example, when complex, multi-axial joints (considered further below) are controlled by multiple actuators as shown in FIG. 1, it is fast, convenient and extremely efficient in terms of data volume and processing time to simply pass the actuator positions rather than the complex joint angles thus created. Thus the system can be configured to simply respond by making the local or remote actuator reflect the appropriately corresponding actuator position at the other end rather than being concerned with the complex angle attained. This is effective because the remote at the other end which has the exact same (or equivalently similar) joint structure and identical (or equivalently similar) actuation assemblies will accurately reflect the motion at the other end using either the technique of sending joint angle degree information or sending actuator positions. In this sample embodiment with its predominant choice of pulling actuators, we will transmit the amount of actuator retraction for each local cable which will be reflected (sometimes in reverse as explained below) at the remote site.

The actuator position, at least in rotary gear driven actuators, can be measured as degrees of turn on the gears, using common digital rotational reading sensors, which is sent to the serial or other communications port on the controlling computer. Speed of local motion is not included in this example. However, it will be seen later that certain remote operation options make it handy to know local speed at the remote site. Even though it is not included here, the remote could calculate the local's joint motion speed using the change in degree over the time since the last transmission was received at the remote or, when local transmission time is sent with the packet, by comparing the time of the current and previous transmissions were executed at the local. For this example embodiment, the initial phase I communication from local site to remote includes minimal information thus reducing communications traffic such that the new actuator positions for each joint and the attitude information is the only joint specific information sent in phase I. Attitude in this document is understood to include pitch, roll, yaw or relative yaw and speed along the net vector.

Phase II: At Remote. The remote, in turn, immediately upon reception attempts to respond exactly to the KCM's it is being sent. It quickly attempts to move the remote joint to the point where that joint is at the precise angle in degrees as the corresponding joint at the local site (here by appropriate reflection of actuator positions). The remote also returns as data (destined to be sent to the local) the amount of pressure currently required to maintain that actually achieved degree position on that remote joint from pressure sensing means along with the other information. However, the remote equipment may not have the power required to move to the degree commanded by the local site and if, in fact, the pressure applied to the joint actuator was not strong enough to move to the desired position, it will still be trying (i.e. pressure will still be applied) and will thus return that maximum attempted pressure (which varies with the aggressiveness approach currently used as described below) as the maintenance pressure amount. The remote may also optionally be configured to return to the local site an "over limit" message or code so that the local site can notify the local site user by alarm or other message means. However, this is not a necessity as will be seen in phase 4 since the local site user will "feel" the resistance to his movements. The only ceilings of force transmission to the local user absolutely required are for his safety thus capping the amount of force applied over time to an amount that would cause no harm to the user.

At both the remote and local, joint angle sensors may be placed at the joints themselves relaying the current angle information to the pressure controller. Alternatively, the pressure controller itself may monitor the joint angle based on the pressure controller's piston position. Finally, the "tendons" (the form of actuators used in this sample embodiment as seen at FIGS. 1,4, etc.) may measure and send the angle position as a measure of fractional turns of their gears (see FIG. 2). The latter approach, which enjoys the simplicity of simply returning the value of an actuator's gear position (rather than even thinking about joint angle) is used in this example.

Also, there are numerous well-known programmatic and equipment means by which the actuator can be controlled to quickly move the joint to the desired angle and monitor/assume a maintenance pressure and position. It is not important which available or new technology is used to assure that the actuator arrives at the desired position at the desired time. For example, rather than using the aggressiveness options shown below, other existing servo or calculated hydraulic means already available may be used. Still, the following techniques designed to make the process effective and flexibly responsive to the particular environment are included to shed light on how the overall approach works.

Aggressiveness approaches: There are specialized techniques controlling how aggressively the desired joint angle is attained. How quickly the remote moves to match the local site's position and with what force can be decided by design implementers using a number of means many of which will differ only in terms of performance to best match equipment, delicacy desired, type of use and intensity of movement. As conditions change, the remote and local site can switch from one of the approaches described below to any other by communicated instructions (as described with the data samples above) or the remote computer can "decide" for itself based on demands put upon it. Although intelligent decisions like this can be decided by the processing means at either end and communicated to the other end, they are, throughout this example of the example embodiment, described as being decided at the local site where you would typically have fewer processor limitations and where you typically would initiate code changes. Two of the many possible aggressiveness options are discussed below.

1. Maximum Aggressiveness: This is the one chosen by the transmitted KCM's above (AGO=1). For fastest response with some potential for loss of delicacy, the remote may be momentarily or by default configured to simply move to the desired degree position of the joint with the remote's robot's maximum speed and power/pressure (remembering that short cycle lengths make this a very small distance moved so that any loss of delicacy or "errors" in speed of accomplishment are correspondingly small and self correcting). The aggressiveness options are tempered by the delicacy setting which may be manually selected by the user or automatically set to match the local user's speed in a particular joint. Typically, a slower motion would be associated with a higher delicacy rating which can be adjusted on the fly at the individual joint level if desired.

This provides for maximum responsiveness and minimum potential MDI which results in favorable performance in very intense movements. A short MDI and quick cycle speed would minimize any "jerkiness" by minimizing the amount of travel per cycle thus maximizing smoothness while tending to minimize any error in motion. Thus, if the desired joint angle is not attained, that maximum pressure attempted will be returned to the local as the maintenance pressure along with the angle that was achieved.

2. Calculated Local Approach to Matching Aggressiveness: When switched to this aggressiveness approach, the remote moves the joint to the desired degree position at a speed and power relative to that of the local site's movement and the restraining pressure over which that motion was achieved at the local site. The faster the local site moved (the further it moved from the local site angle in the last cycle) the faster the remote moves and the more resistive pressure the local site was overcoming at time of movement the more power the remote exerts to achieve the desired angle. In this pressure driven actuator example used in this sample embodiment of the current invention both initial speed and initial pressure over which that speed was attained result in a calculated initial pressure for the actuator to exert in attaining the new position. In this example of aggressiveness option 2, the two measures (speed and resistance pressure) are used in application of appropriate algorithms to determine the initial pressure to be applied to the actuator to move to the angle desired in the time allowed (the same amount of time that the local required to achieve that change in angle). Different approaches to monitoring joint angle, like those discussed above, will result in this initial pressure being changed as the joint nears the desired angle such that the ending pressure will be the load maintenance pressure.

While algorithms to calculate this initial pressure will vary with equipment, implementers, environment and application, the load, speed and resistance managing calculation below is one such calculation. The calculation below is included as an illustration only, however, since there is no shortage of existing means to achieve this kind of response.

D=the distance the hydraulic cylinder in the local actuator moved to attain the change in angle and the local joint. (This linear change is easier to describe in mathematical terms than calculating changes in angles/pressure over time and, is in fact the method used in the embodiment of the invention used in this example.)

T=the amount of time the local had to achieve the change in angle.

P1=the maintenance pressure from the previous cycle i.e. the pressure in pounds per square inch that must be added to or subtracted from to achieve the desired acceleration over time.

P2=the amount of pressure in pounds per square inch to be added to or subtracted from P1 to achieve the desired acceleration over time.

In this sample embodiment, all movement and acceleration is controlled by modifying the pressure that is applied to the hydraulic cylinder in the actuator.

Thus:

$$P2 = P1/32 * 2D/T^2$$

While such calculations are in no way part of the unique features of the current invention, they are mentioned here to help the reader see some of the means for applying the unique attributes of the current invention.

However, when the desired angle is not being attained as expected, the remote can be temporarily or permanently configured to either:

A. Stop and return the value of the position actually attained to the local and the pressure currently being exerted against it or B. Increase actuator pressure up to the maximum available and then return the resulting angle attained and the residual pressure to the local in the next phase.

Notes on aggressiveness strategies.

1 would often be the best for a more fast and furious requirement.

2 provides a gentler touch without sacrificing all the speed.

Additionally any number of aggressiveness or servo based mechanisms or other strategic options can be added and implemented.

Even the difference in the two aggressiveness approaches already mentioned and in other obvious variations, however, is minimized by the self correcting process inherent in the four phase design. By minimizing the time between cycles we break movement into smaller pieces thus cutting "errors" in speed duplication into smaller, less perceptible pieces.

After the desired or attained angle is complete, regardless of the choice of aggressiveness options, there are also specialized techniques to bring the joint quickly to rest at the attained angle, supported by the maintenance pressure.

1. The first is a classic approach. Here, when the desired angle or actuator gear position is attained, the pressure controller reduces the pressure, re-samples the joint angle and then re-adjusts the pressure accordingly until the precise angle is attained and maintained/supported by the amount of pressure required to maintain that angle. This is similar to many servo based or hybrid approaches.

2. The second approach requires a pressure sensor for each joint in addition to pressure sensing means for each joint pressure control unit (the means by which pressure to the joint actuator is applied). When the desired joint angle is attained, the pressure sensed at the joint sensors (Po) may differ from the pressure sensed at the pressure controller (Pi). Thus, the change in pressure to be effected by the pressure controller is Po−Pi. If, for example, at the instant the desired angle is attained Po=Pi (or is within a prescribed tolerance) there is no adjustment needed and Pi is the maintenance pressure value to be returned. However, if Po<Pi then an immediate correction is needed to prevent over shooting the desired angle. Rather than a tedious trial and error sampling approach, Pi may be immediately decreased by Pi−Po and the maintenance pressure value returned as Po. Also, if Po>Pi (for example when some change has occurred such as a suddenly increased resistance at the remote) this second approach can respond even prior to the next cycle by instantly increasing Pi by Po−Pi which will immediately offset and maintain the current position against the higher Po. Since this higher pressure will then be the pressure value returned to the local site as the maintenance pressure, the local user will immediately "feel" that suddenly increased resistance even before the next cycle begins. Of course, this additional contact pressure sensing means increases the number of signal wires and sensors, but it provides faster performance than a more classic approach making possible a shorter cycle length.

3. A third approach to monitoring the joint angle is to make no adjustment at all after attaining the desired angle and simply returning Pi as the maintenance pressure value. In applications with short cycle lengths, any position over shots or under shots will be tiny and smoothly corrected by the next cycle. In this example, the last approach is used.

4. A $4^{th}$ approach simply calculates what pressure would move the resistant weight the desired distance in the desired time, immediately issues the command to execute the new pressure and, without waiting to see how it works out, proceeds to Phase III where it sends that calculated estimate of pressure to the local as the resistance weight and the desired joint position as the achieved joint position on the assumption that they will succeed. In the next cycle, if it has succeeded exactly, the process continues without adjustment. If, instead, this cycle overachieved its angle slightly and is further than the now current position, the estimated pressure to correct the remote position to match the now current local position is applied and this new pressure and desired position will be returned in Phase III of that second cycle to the local. This allows for very fast cycles which provides superior responsiveness. The resulting shortness of the cycles, in turn, minimizes the magnitude of over and under "shots".

These approaches are for example only. Any functional approach to perform the same graduated progress to a desired point are applicable to the current invention.

Phase III: Remote Responds with its Values:

The remote then transmits to the local site the degree position it successfully attained, the retained pressure required to maintain said position at the remote and the attitude information. (It may, of course, in other embodiments, also send more global positioning, sensory and configuration data.)

Sample data format: Transmission from Remote to Host in Phase III

| Joint# | Angle | Pressure | Misc1 | Misc 2 | Speed | Elapsed Time |
|---|---|---|---|---|---|---|
| 9991 | 002359 | 002000 | | | | |
| 0001 | 14.021 | 9.000 | | | | |
| 0002 | 105.031 | .008 | | | | |
| 0003 | 73.070 | .002 | | | | |
| ... | | | | | | |
| ... | | | | | | |

The 9991 isn't for a joint in this example but is attitude sensor number 1 whose data includes information on pitch, roll, vector direction and speed along the vector. Attitude sensors, when added to the basic configuration, provide better control of balance and dealings with odd terrain. For a more thorough listing of this and other extended data types that can be transmitted, see the Positions.dbf table under EXTENDED DATA SUPPORT FORMATS below. Any of these data values can also be transmitted and formatting information there is helpful. For example you can interpret from the sample data above (which places two 3 characters codes in both the angle and pressure fields that the pitch at this location at this time is 002 (2 degrees), the roll is 359 (or −1 degree), the relative yaw is 002 degrees and the velocity along the prescribed vector is 000 (since we're just starting). Either the local has to conform it's attitude to the remote or vice versa. In this example, the local conforms its attitude to that of the remote thus attitude info is sent from remote to local in this phase.

In Phase III the "pressure" field refers to maintenance pressure. In this example it can be seen that joint #0001 did not achieve the 14.065 actuator position it was intended to reach. Not surprisingly, while 0002 and 0003 were apparently unopposed returning minor resistance pressures, joint #0001 exerts substantially more pressure. The pressure joint #0001 is exerting 9 pounds because the delicacy option chosen was 2 and for joint #0002 that required that no more than 9 pounds be exerted and this was not enough to move to the desired angle thus the return of that same value as the resistance level.

It should be noted here that there is only one record here per joint. That is because this example relates to a joint controlled by a single actuator functionally similar to the ones in FIG. 3 most applicable to joints whose travel is limited to one plane. For other joints requiring multiple planar control, such as a wrist as in FIG. 1, multiple (4 used here) actuators may be required to provide precise multi-planar motion. Thus, in that example, there would be 4 records for each such joint.

Phase IV: At local site. The local site immediately responds to the response KCM's from the remote (MDI is set, in this example, to 0 thus no cyclical delay is required). The remote returned a value indicating the restraining pressure at the remote and the angle achieved. What the local does at this point varies drastically depending on multiple factors.

Note: In this simple, one dimension of rotation example, the user attempted to increase the angle of the joint as he attempted to rotate the joint counter clockwise (like when an extended finger is being closed as shown in FIG. 3 from right to left). Thus, we would say that the angle of the joint becomes greater. This greater and lesser convention will be used below to make the multiple angle comparisons simpler. We will call the local angle position that the local sent to the remote in phase I for this single joint example P1. We will call the angle achieved and returned by the remote to the local at the end of phase III P2. It should be noted that, while waiting for the remote to respond, the local joint may have continued past the position it last communicated to the remote (against any resistant pressure) or the user may have reversed the direction altogether. Thus, to accommodate that intra-cycle motion, we will call the angle at which we now find the local joint prior to any phase IV adjustment, P3.

The actions that must be taken by the local in phase IV are diverse and based on the relative positions and pressures at both ends.

Case 1: If P3=P2.

Either no motion occurred since the last end of phase IV or it was self-negated by the movement of the local during phase 1, 2 and 3, if any. No physical adjustment is necessary. However, resistance pressure is another matter. In this embodiment the remote actuator increases angle by increasing hydraulic pressure and maintains position by continued but minimal required positive pressure after position is achieved. If the remote actuator had to exert a force (which can be positive or negative—pressure or vacuum) of F2 to maintain position at the remote, the local would now at this instant assume a pressure of −1*F2 plus or minus special equipment adjustments (assuming a joint that is not controlled by offsetting actuators like the tendons below but is simply pushed or pulled by positive pressure or a vacuum).

Special equipment adjustments apply to most force measurements and will slightly increase or decrease the pressure adjustments given to accommodate equipment anomalies such as vacuum v.s. pressure actuator performance in the equipment (since it is not uncommon for equipment to require conversion factors to correct slight differences in the net performance of vacuum v.s. pressure in equipment) and special adjustments to make the local's equipment seem weightless by offsetting its weight programmatically.

At this instant at the end of phase IV, the local actuator position is unmodified by the equipment's programmatic controls but the pressure (in this case a relative vacuum) pulls against the local user with a force like the one "felt" by the remote equipment producing the local user's feel of resistance. The positional value to be forwarded next to phase I programming logic for immediate transmission is P3 (which is a more accurate measure of the ideal KCM to send in phase I than P1 and P2 because of the limits of mathematical rounding in the comparison math).

Since, at this point in typical case based logic, case 1 has already been tested and not found to be the case (or the system wouldn't be testing the other cases below), at least one of all the values shown below is different from the others. Thus even though you see "P3>=P2 and P2>=P1" below, at least one of the values is unequal to the others (either P3>P2 or P2>P1 since they can't both be equal). If this were not the case, much of the logic below would not make sense.

Case 2: If P3>=P2 and P2>=P1

Here the remote dutifully and successfully emulated the local's position but the net movement of the local, while phases 1, 2 and 3 were happening, continued moving in the same direction.

You would not think P2 could ever be greater than P1 when the local's specific instructions were to move to a specific and greater angle. But, should an equipment misadjustment or system tolerance allow this to happen (some of the very rapid remote angle advancement and rapid position stabilizing techniques and equations will result in minimal overcompliance) or an external circumstance at the remote force it to happen, the programmatic approach below will deal with it properly. No physical repositioning of the local is required and the pressure applied at the end of phase IV will be caused to be the relative negative of F2 reflecting the resistance at the remote at the end of phase 3 as in 1 above. The positional value forwarded to phase 1 programming logic for immediate transmission is P3.

Case 3: If P2>=P3 and P3>=P1

Here the remote complies or even over-complies (usually for the sake of speed) with a local order to advance but the user's continued motion during phase 2 and 3 did not make up for it. If P2=P3, no adjustments will be necessary. Otherwise, while adjustments will be very minor, the local will now be further accelerated in its current direction of motion to the position P2 so the local user will be completely caught up and perfectly in sync with the remote. The resistance pressure will be applied. Again, the resistance will be the relative negative of F2 but, since over-compliance typically would not happen when the remote was encountering motion resistance, it can be a positive number reflecting the relative inertia (relative because it is comparative to that of the local) of the remote's motion and the lack of current resistance at the remote. The positional value forwarded to phase 1 programming logic is P2

Case 4: If P3>=P1 and. P1>=P2. Here the remote is lagging behind due to some resistance and the local, during the time spent in phases 1, 2 and 3, did not reverse its direction. The local will now move the local joint to that lesser angle (P2) by applying reverse pressure. Now P3=P2 and, with the local joint now in positional synchronization with the remote, a maintenance pressure opposite but equal to the maintenance pressure at the remote (F2) is now maintained on the local joint.

The positional value forwarded to phase 1 programming logic is P2.

Case 5. (P1>=P2 and P2>=P3) or (P2>=P1 and P1>=P3)

In both cases the user has reversed his direction and his new position is less than that requested by the local in phase 1. In both cases, no forced repositioning of the local joint is needed. If P1>=P2, the maintenance pressure will be the relative negative of F2. Otherwise, for this cycle, no resistance pressure is needed (except for equipment error and weight factors discussed above).

The positional value forwarded to phase 1 programming logic is P3

Case 6. P1>=P3 and P3>=P2 Here the remote failed to reach P1 and the local reversed his direction during phase 2 and 3. However, if P3>P2 then the user didn't back off enough to eliminate the need for a positional correction and the local joint will now be moved to P2. Whether P3>P2 or P3=P2, the maintenance pressure will be the relative negative of F2.

The positional value forwarded to phase 1 programming logic is P2

In any of the cases, the local and remote equipment are in sync and the user "feels" the appropriate resistance pressure on every joint. Phase I of the next cycle follows immediately wherein the positional and other optional values mentioned earlier are sent to the remote continuing the process with the next cycle.

An example of complex joint control:

The single, two dimensional joint example above, however was the simplest example possible. The process is more complex in multi-dimensional joints although the basic approach is similar (and better understood after understanding the above). Complex, multi-dimensional joints can be controlled in a similar manner with additional math and control techniques added to the control programming. An example is where four symmetrically spaced actuators control a single multi-dimensional rotating joint as in the wrist illustration in FIG. 1.

FIG. 1 is an example of one method that uses tendon (light cable) pulling actuators for retracting tendons to achieve angle changes and positional support in joints. (Optional tendon guides not displayed.) The joint hardware shown is an open design minimizing weight and interference. However, for some applications more full coverage external joints also moved by these same actuator assembly options can be used. The effective internal joint geometry is illustrated by the imaginary ball joint sphere superimposed over the wrist in FIG. 1 at the axis of the wrist just below the B. Although actual wrist motion is more restrictive in some dimensions than a mechanical, full motion ball joint, within the range of motion used herein, this geometry illustrates some of the effects and demands of multi-axial rotation.

Since, in this described embodiment, the remote is provided with human-like body parts and joints using the same actuator assemblies in both the local and remote locations, these figures are useful for both picturing the remote and the local equipment (since they can be identical).

While this human-like robot form simplifies the explanation of the underlying geometry, math, mechanical processes and why they work, at the remote location, i.e. on the robot, more classic robotics parts can be made to perform these same programmatically conspired operations. Also, it should be observed that the illustration in FIG. 1 is not indicative of how much a joint moves in a single cycle. While the illustration shows a roughly 140 degree swing from fully bent in to fully reversed, a typical cycle might only move a tiny fraction of one degree because of the shortness of the motion cycle.

The focal joint in this example is the wrist.

Phase I. Local Site: As in the simple joint example already considered, but here more abbreviated since many basics have already been explained in the simpler example, the KCM's are sent to the remote. However, there are more KCM'S for the joint now being considered because there are more actuators guiding it. In this example, we will consider the action proceeding from FIG. 1B to FIG. 1A i.e. that of the wrist being bent forward. Again, the two pictures vastly exaggerate the amount of motion in a single cycle but they are useful in identifying the nature of the motion being considered.

The local user effected this motion by simply bending his wrist forward. From the joint's point of view, the joint has been rotated counter-clockwise which would mean that tendon 10 has retracted (due to the minimum pressure always kept on a tendon, which is offset by the minimum pressure of the opposing tendon, and the slack created by the user's motion) and tendon 14 has extended (being pulled by the user) to allow that movement. To make this example much simpler, we will assume that tendon 12 and tendon 16 (hidden behind hand in FIG. 1) are unchanged thus confining movement to the plane of the paper.

Phase II. Remote Site: The remote attempts to respond to the KCM's by retracting its tendon 10 to the same position as that of the remote and releasing tendon 14 to match tendon 14 of the local. Had the positions of tendons 12 and 16 been changed, the remote would respond to them in the same way effecting full multi-dimensional motion. Techniques for accomplishing the desired positions, whether servo, calculated, estimated or real time progressional as well as the response for failure to achieve the position, can be effectively the same as above and the return of maintenance pressure also follows the above example for a simple joint. However, there are now 4 sets of KCM's (one for each tendon) instead of one.

Phase III. Remote Site: Responds With its Values:

Phase IV. At Local Site:

We have assumed that the movement was perfectly in the plane of the paper thus avoiding, for the moment, the additional complexity of multi-planar movements requiring simultaneous adjustments on all 4 tendons rather than the two affected here. Also, for simplicity in the quantitative comparisons below, we will speak of the counter-clockwise motion in this example as increasing the angle as the hand rotates around the wrist joint with motion occurring in the plane of the paper.

In the process of retraction, the actuator for the remote's tendon A retracted to the position we will call Pa2 which, in this sample embodiment, is measured here by the graduated position of the actuator gear controlling remote tendon A.

However, it is possible that, in the Phase I KCM's the remote may have been instructed to move, in phase II, the remote tendon A just a bit further—all the way to Pa1 (the local's current position in phase I) to match the local's position. Forces at the remote may have allowed only partial forward movement towards Pa1. Similarly but oppositely, still at the remote, tendon C increased its extension to an angle we will call Pc2 (the actually achieved angle). We will call the angle that the local finds itself in at this time, recalling that the user has not been sitting still during the previous phases 1, 2 and 3, Pa3. The remote had to exert a force of Fa on its tendon A and Fc on tendon C to hold the positions actually achieved.

Fb (the force exerted on tendon B), Fd (the force exerted on tendon D), Pb1 and Pb2 (the positions of tendon B at the local and remote respectively), Pd1 and Pd2 (the positions of tendon D at the local and remote respectively) can be ignored in this example since this example is limited to one plane of motion.

Also, it would be nice if, for simplicity of example, we could assume here that the equipment at the remote and the local equipment are sufficiently identical in size (or at least in precision of ratio) such that we would need only track the possibilities (cases) where the offsetting tendons move perfectly in tandem. In other words, if tendon A retracts an inch, Tendon C extends an inch. The same for B and D. However, not only is the human body not symmetrical in the full range of complex rotations but there are conditions in many embodiments where slight equipment tolerance along with body asymmetry makes the current invention's fully independent control logic for each tendon and matching (or relative) joint structure between local and remote equipment a strong design asset allowing significantly more precision and responsiveness where the rubber meets the road.

In an attempt to simplify this four-fold increase in control description complexity, we will review only two tendons, A and it's corresponding opposite tendon C. We will assume that the reader can easily apply the case logic determining what must be done to local tendon A in this phase IV example to the other tendons by substituting each tendon's letters in place of the a's (convert, for example Pa1 to Pc1 to see the case logic for tendon C instead of tendon A in the case logic below). Similarly, to calculate the resistance pressure for tendon C one would, just as we based the pressure for local tendon A on the resistance pressure of the remote tendon C (C opposes A), one will always base the pressure on the opposing tendon. Thus, as a further example for local tendon B you would base its resistance pressure on remote tendon D (Fd).

Note for the cases below: The case logic below can be compacted but the logic, as written, simplifies for the mathematician, the matching of theoretical possibilities of combinations and allows for separate explanation of the reason why different circumstances might result in the same action.

Case 1: Pa1=Pa2=Pa3

Nothing moved or, by the time we came back to phase IV, things were in this already synchronized state. No positional change is necessary. However, the maintenance pressure on this local tendon A is now based on the maintenance pressure on its opposite tendon (in this case Fc).

We say "based on" Fc above (instead of "precisely equal to") because, as mentioned above and assumed below, software adjustments to these figures may be made to accommodate both the weight and inertia of the equipment (to make it feel weightless) and also to provide tension between opposing tendons even when no work is being done to keep them firmly in position without precision killing slack.

There are at least two types of such adjustments:

1. Static Offsetting Adjustments: A fixed minimum offsetting pressure (always a positive number in this pulling tendon based embodiment because the pressure that creates that "negative" pulling pressure is positive) would always be in effect. We will call this static offsetting pressure, for tendon A, Oa, Oa, Ob, Oc and Od for a single joint will typically be the same fixed amount (although they will vary for different joints). For example, in the wrist joint shown in FIG. 1, for a wrist completely at rest (hanging limp at the user's side with no resistance in any direction at the remote) you might still have some small fixed minimal pull on all 4 tendons. These would offset each other causing no movement but holding the equipment comfortably in place with no "play" in the tendon to degrade responsiveness. For the sake of example we will assume a minimal tension force equivalent to a weight of 4 ounces. Then, when a load of 5 pounds occurs at the remote requiring a pull of 5 pounds at the local only on tendon A, tendon A might exert a pull of 5 pounds 4 oz while the other three tendons exert only the 4 oz thus preserving a true net differential of 5 pounds and balanced tension. The remote has its own Static Offsetting Adjustments but these are stripped out of the numbers Fa2, Fb2, Fc2 and Fd2 before they are sent to the local at the end of phase III. This is because there is no requirement that the remote and local have the same Static Offsetting Adjustment for corresponding joints. Although, in this example embodiment, the remote and local equipment are essentially identical and thus the Static Offsetting Adjustment amounts at the remote and the local should initially be identical, completely separate Static Offsetting Adjustment values are allowed at the local and remote so that:

a. Maintenance personnel for the local or the remote equipment can programmatically "tighten up" a joint assembly (by increasing this value on a single joint or even a single tendon at a time) without confusing the software at the opposing end and b. These independent sets of Static Offsetting Adjustments (allowably different at local and remote) make it possible for the remote assembly to be modified to use more conventional robotics design for some applications without destroying the mathematical relationships described here.

Thus, the F values sent to the local in phase IV do not include, in this embodiment, the remote's potentially unique Static Offsetting Adjustments and those of the local must be calculated below.

2. Calculated Gravity and Inertia Based Adjustments. Software algorithms can be included, particularly at the local, to either calculate or measure with a sensor the effect (pressure on the joint) of gravity and inertia on the equipment worn by the local user affecting the joint in question. This calculated value can be either positive or negative and will be called Ga for tendon A, Gb for tendon B and so on.

These two adjustments are considered together to create a single adjustment pressure using the following logic:

NetAdjusta=$Oa+Ga$

If NetAdjusta<$Oa$ then NetAdjusta=$Oa$.

Thus, the minimum fixed joint stabilizing pressure is always present even if other factors more than offset it. The tendon is never slack and the opposing tendon offsets this minimum pressure.

Thus, in this case 1, the position returned for the subsequent phase I transmission to the remote is Pa3 while the maintenance pressure returned is the result of the equation:

Maintenance Pressure for $a=Fc+$NetAdjusta

The remaining cases involve at least one unequality since the above considered the case of general equality.

Case 2: Pa3>Pa2 and Pa2=Pa1

Here the remote dutifully and successfully emulated the local's position but the net movement of the local, while phases 1, 2 and 3 were happening, continued in its original direction.

No physical repositioning of the local is required. Pa3 will be the value sent to the remote for position emulation in the ensuing phase 1 and the maintenance pressure will be calculated as:

Maintenance Pressure for $a=Fc+$NetAdjusta (recalling that NedAdjusta is calculated as shown in case 1 above).

Case 3: (Pa3=Pa2 and Pa2>Pa1) OR (Pa322 Pa2 and Pa2>Pa1)

Here the local user continued his direction of motion during the previous phases 1, 2 and 3, if any, but the remote has already moved beyond the desired angle (Pa1) due to a force at the remote (perhaps a pulling force on the remote joint or a slight equipment error that will be adjusted here). Since the local joint is already precisely at the remote's position, no change in local joint angle will be required. The joint position saved to send with the next phase I KCM's will be Pa3. The maintenance pressure will be calculated as:

Maintenance Pressure for $a=Fc+$NetAdjusta.

Case 4: (Pa3=Pa1 and Pa1>Pa2) OR (Pa3>Pa1 and Pa1>Pa2) OR (Pa1=Pa3 and Pa3>Pa2) OR (PA1>PA2 AND PA2<PA3)

The remote is lagging behind due to some resistance and the local user's movement during the previous phases 1, 2 and 3, if any, left him just were he was when he finished the last phase IV. The local CPU will record Pa2 as the current position to send with the KCM's in the next phase I and move the local joint from Pa3 to Pa2.

Maintenance Pressure for $a=Fc+$Valuea

Case 5: Pa3>Pa1 and Pa1=Pa2

The remote dutifully achieved the angle desired in phase 3 but, in the meantime, the local has moved on to better things (Pa3). No adjustment is necessary. The position returned for the next phase 1 is Pa3.

Maintenance Pressure for $a=Fc+$Valuea

Case 6: (Pa2>=Pa1 and Pa1>Pa3) Reversal

The local user reversed his direction while waiting for the remote to respond). No local joint adjustment is necessary. The local CPU will record the new actuator position Pa3 which will be sent to the remote as the angle to emulate in the KCM's of the ensuing phase 1.

Maintenance Pressure=NetAdjusta. Since there was a reversal of direction at the local, the maintenance pressure at the remote trying to go a different direction will not be of interest until the next cycle (when the remote measures resistance attempting the right direction). Thus adjustment pressures are the only relevant player in calculating the Maintenance Pressure.

Case 7: Pa2>Pa1 and Pa1>Pa3 Reversal

This is very similar to case 6 with one important difference. Again, this is a reversal where the user reversed his direction during phases 1, 2 and 3. However, some force has taken the remote beyond its previously instructed point (Pa1). In this case, the local joint will be moved to Pa2 and the maintenance pressure must be considered so the user can "feel" that force. The maintenance force will be calculate as:

Maintenance Pressure for $a=Fc+$Valuea

However, an exception can be set to be made when a very aggressive angle emulating option is chosen for phase 3. For example, in one aggressiveness option the remote estimates the change in pressure needed to "shoot" the joint into position in a very short predefined period and then does it quickly and remorselessly. If it overshoots a little, it will be corrected in the next cycle. To accommodate this kind of aggressiveness option, the system can be set to treat this case 7 just as we do case 6 if and when we're using certain aggressiveness procedures and when the difference between Pa1 and Pa2 (the "error") is within an acceptable predefined angle range and the change in maintenance pressure between this cycle and the previous cycle is within a preset tolerance. This will, except when there really is some compelling external force at the remote causing it to disobey an angle command, allow the extra fast response options to self correct between cycles without undue vibration.

Case 8: Pa2>Pa1 and Pa1=Pa3

Here the remote has been forcibly pulled past its desired goal of Pa1. We say forcibly because normally, using the amounts of pressure the remote is authorized to use to obtain an angle (based on the aggressiveness or method options currently being used), the joint would not exceed its goal. However, some of the extra fast aggressiveness options allow overcompliance in seeking a joint angle at the remote and this is a possibility even if forces at the remote don't overpower the default strength exerted by the remote. Thus the local joint will be moved to Pa2 and the maintenance pressure will be calculated as Maintenance Pressure for $a=Fc+$Valuea Case 9: (Pa2>Pa3 and Pa3>Pa1) OR (Pa2>Pa3 and Pa3=Pa1)

Here the remote has exceeded the desired angle in phase 3. If Pa3>Pa1, the local has also passed that angle requested in the previous phase 1 but, even if Pa3=Pa1, the key fact is that the remote has exceeded both. Thus, the local joint will be adjusted to Pa2 and the maintenance pressure is calculated as:

Maintenance Pressure for $a=Fc+$Valuea

Case 10: Pa2=Pa3 and Pa3>Pa1

Here, the remote exceeded the requested angle and the local user did too since he continued moving in the same direction during the previous phases 1, 2 and 3. However, there is no local joint adjustment required.

The maintenance pressure is calculated as:

Maintenance Pressure for $a=Fc+$Valuea

Case 11: Pa1=Pa2 and Pa2>Pa3. Reversal

Here the remote precisely accomplished the angle the local requested in phase 1. Meanwhile, during phases 1, 2 and 3, the local user reversed his direction to a position even more "short of" the angle requested than the remote's accomplished angle. The angle saved for sending as a KCM in the ensuing phase 1 is Pa3 and there is no maintenance pressure required except the adjustments thus the maintenance pressure is calculated as:

Maintenance Pressure for a=Valuea

Case 12: (Pa1>Pa2 and Pa2=P3) OR (Pa1>Pa3 and Pa3=Pa2) Reversal with no adj needed The remote fell short but the local user reversed to the same position as the remote. Thus no local joint adjustment is needed and the remote's maintenance pressure is appropriate. Thus the maintenance pressure is calculated as:

Maintenance Pressure for $a=Fc+$Valuea

Case 13: Pa1>Pa2 and Pa2>Pa3. Reversal

The remote fell short but the local user's reversal of direction more than offsets the shortfall as a new direction is initiated. Thus, no local joint position adjustment is needed. Pa3 is the position stored for later sending to the remote as a KCM in the ensuing phase 1. The maintenance pressure at the remote is not relevant since a new direction has been taken (we'll get it on the next cycle) and since Pa3 is even less than Pa2.

Case 14: (Pa1>Pa3 and Pa3>Pa2) Reversal

The remote fell short of Pa1 but the local mitigated that problem with a subsequent move, during phases 1, 2 and 3, back closer to the remote's sticking point. Still, the local must be adjusted to Pa2 and the maintenance pressure for a is calculated as: Maintenance Pressure for a=Fc+Valuea As mentioned above, the same logic must also be run for each of the other 3 tendons in this example joint using the relationships and processes described above.

At this point, after processing phase IV as shown above, we proceed on to phase 1 to continue the cycle.

With all joints refreshing positions in real time or in identical timeslices, the whole body of joints perform at the local and remote to provide a genuine full body sense of being there and an effective means of controlling remote action interactively in real time.

Taken a joint at a time, this seems like an extremely complex exercise in futility. However, when multiple joints are considered simultaneously, the global strategy becomes more obvious. For example, if the remote is picking up a barbell, the user, though empty-handed, through the simultaneous combination of all the joints involved, feels both the weight and the actual shape of a "phantom" bar in his hand as well as the pressure on his fingers holding the bar and his back and legs supporting the "weight".

Parallel Processing Embodiment

It is obvious that the basic concept behind the above example doesn't necessarily depend on any number of phases. Not only can it function with a different mix of phase separated functions, it can operate without any phases at all. Using the concepts described above it can now more easily be seen that phase 1 KCM's can be continuously sent to the remote reflecting the local's position on an unencumbered (dedicated only to carrying local KCM's one way to the remote to reduce communications traffic) communications means A while the remote is communicating its position and pressure, etc. on a second unencumbered communications means B. While these 2 lines or channels can be combined into one, the separation can provide faster response. This simultaneous, parallel processing can provide, where adequate bandwidth for more data and short transmission times are available, exceptional speed, smoothness and fluidity since the data refresh rate can be extremely fast and the local can be resampling and readjusting while the remote is still responding to its last instructions. This tends to eliminate delay and jerkiness while requiring more communications performance. When this parallel processing option is used, the case logic concept above still follows. The difference is that the resampling and response is not in phases but either in real time or timeslices. In either case, the tendon positions and resistance relationships between the local and remote joints follow the above concept i.e. the local applies a back pressure based on the signal from the remote, the remote targets and attempts desired positions based on the local positions and they both follow logic responsive to each other.

Parallel Processing of 2 signals. There are additional processing embodiments that allow increased responsiveness by simultaneously sending and receiving data between the two processing means rather than a sequential, multi-phased process as described above. One such parallel communications embodiment involves a simultaneous (or in other embodiments not necessarily simultaneous but continuous) send from local to remote and from remote to local at each occurrence of a tick. A tick is a specified amount of time which varies by application and the capacity of equipment used. It is possible to make ticks much shorter than the period of time it takes the actuators to adjust to a change. This can have the effect of providing a continuously adjusting system with greater smoothness and faster response to changing circumstances. For example, if the equipment could typically respond to 15 adjustment cycles per second during moderate action, we could expect the actuator to typically respond to our pressure driven response calculations in about $1/15^{th}$ of a second. In other words, using calculations similar to those shown above to estimate a change in pressure that will achieve the desired position in a specified time, we would use $1/15^{th}$ of a second for that specified time which thus determines the pressure to be used.

Thus, when an actuator is instructed to move 0.10D ($1/10^{th}$ of a degree) the change in pressure by the joint's JPC (Joint Pressure Controller) would be that estimated to accomplish that movement in $1/15^{th}$ of a second rather than the potentially shorter tick period. For example, a tick could be set at $1/60^{th}$ of a second providing more frequent recalculation and calculation readjustment delivering much of the readjustment sensitivity and smoothness of 60 responses per second on equipment that could only process 15 changes per second.

Since this process ensures that the remote equipment will frequently not have completely achieved the changes in degree that the local has instructed by the time the next tick occurs and since this example embodiment process is not separated into sequential event components of a full cycle, the simple fact that the remote's joint angle did not make it to the demanded angle no longer means, definitely, that the remote has met resistance. While, it is obvious when none of the demanded advance was made after 1 or 2 ticks that resistance has been met (and ticks are very short), an even more responsive method uses a minimum performance standard fraction making it possible to typically sense resistance in the very next tick.

Where 1/x is the minimum fraction of achievement used in this example to measure the minimum amount of ordered progress the remote must have (to be considered unrestrained based on equipment and the chosen length of a tick), improved it's previous position by more than $1/x^{th}$ of the demanded change. For example, if x=4 then as long as the remote achieved $1/4^{th}$ of the change in position it was instructed to in 1 tick, the remote is considered in compliance with the local i.e. enjoying unprevented motion. For purposes of example only, the illustration below uses x=4.

The approach is self adjusting and it is possible to tune the workings of this approach to the equipment and the application by choosing values for x and the length of a tick as well as calculating the pressure required to achieve a degree change over a time period against a shorter or longer time period than the hardware's actual standard performance (since it will be adjusted and refined with each tick based on actual progress). It also more quickly self adjusts the speed of motion and responds more quickly to very sudden changes in direction of motion of the equipment at both ends as it samples the data and adjusts goal approach pressure (which drives speed) with each high speed (short) tick. In this data example, the length of a tick has been chosen such that it takes roughly 3 ticks to complete an adjustment to its final point.

For simplicity this hypothetical example and data use the single cylinder, push type joint control. Thus a positive motion at the local results in a positive motion at the remote rather than an opposite and/or composite motion because of offsetting pull based tendons. However, the approach works just as effectively with offsetting pull tendons although the obvious reversals and minimum pull adjustments still apply as they did above.

Remember that it is normal for it to take multiple ticks to adjust to a change at the local or remote since that is what a tick is. A tick can be intentionally chosen to be a fraction of the time it should take to do a typical operation. In fact, the length of a tick can even be different after each tick being calculated dynamically based on the amount of the difference resulting from the conditions following the previous tick (in this example we just set it such that it should take about 3 ticks for a given change to be accomplished). In this example embodiment we have chosen to set the tick as shorter than the time it takes to make a typical adjustment which provided a responsive means but makes the data below look unresponsive until it is recalled how quick the tick is. Regardless of how quick the response of the equipment can be, the tick is, here, faster.

Continuing to reissue commands before the previous ones ever finish based on new numbers provides a continuously correcting, smoother result. A code outline below describes one of many basic code embodiments that support simultaneous communications rather than the sequential, phased embodiments described above and retransmission that can far exceed equipment speed for quicker response and more smoothness.

| AT LOCAL: | AT REMOTE: |
|---|---|
| Initial Synchronization yields local angle LD and pressure LP | Initial Synchronization yields remote angle RD and pressure RP |
| Public OldRd,OldRp,OldLd,OldLp | |
| | Public OldRd,OldRp,OldLd,OldLp |
| Do while .t. | |
|   OldRd=RD, OldRp=RP, OldLd=LD, OldLp-LP | Do while .t. |
|   Do Xnit && Send LD. Receive RD and RP etc. |   OldRd=RO, OldRp=RP, OldLd=LD, OldLp=LP |

-continued

| AT LOCAL: | AT REMOTE: |
|---|---|
| if RP<>LP or not MinimumAchieve(RD)<br>  * MinimumAchieve function compares RD to OldRd<br>  *against the minimum acceptable percentage * *<br>  *returning .t. if successful and .f. if not.<br><br>  NewPressure=CalcPressure(RD, RP, LD, LP)<br>  *This new pressure is the resistance pressure to be<br>  * felt and, if the remote has been so resisted as to<br>  * require repositioning of the local, this pressure will<br>  * be the calculated amount to move the local to the<br>  * desired angle.<br>  Do changejointpressure with ThisJoint,NewPressure<br>endif<br>do WaitForTickEnd &&Wait for end of tick period to<br>     && expire<br>enddo | Do Xmit && Send RD and RP. Receive LD, etc.<br>if RD<>LD<br>  NewPressure=CalcPressure(RD,RP,LD,LP)<br>  *This new pressure is the pressure required to move<br>  * the remote to LD in (for this example) about 3<br>  * ticks.<br>  * CalcPressure also interrogates OldXX values to<br>  * compare progress w/minimum achievement angles<br>  * to sense and respond to overpowering resistance<br>  * with programmatically scaled up pressures<br>  Do changejointpressure with ThisJoint,NewPressure<br>endif<br>do WaitForTickEnd &&Wait for end of tick period to<br>expire<br>enddo |

Using the above alternative codified embodiment, a series of events like the hypothetical data sampling below could occur. However, this example has been greatly compressed for brevity of example. In actual practice, many, many more ticks would be involved to move from initially synchronized stasis, through an acceleration period and through a resisting obstacle to a synchronized state.

| TICKS | Remote | Local |
|---|---|---|
|  | Synchronize remote and local normally (typically from a fixed position such as seated). | Once synchronized, the ticks begin. Ticks are either fixed length or may be changed continually by the software.<br>Calculate Actions from memory stored values and code |
|  | Example Values after sync: .0# at .10 degrees. | Example Values after sync: 0# at .10 degrees. |
| 1 | SEND Current data 0# .10D | SEND Current Data: .20D<br>.02# pressure. The user advanced his position to .20D. The increase in pressure is caused because the local user advanced the local equipment against static air, liquid hydraulic or other form of pressure along with potential inertial resistance of his own body. |
|  | Remote conditions unchanged. |  |
|  | Local said .20D so order JPC to move to .20D | Order JPC (joint pressure controller) to match the remote's pressure just received (0#). |
|  | Process these adjustment(s) for remainder of tick period. | Process these adjustments(s) for remainder of tick period. |
| 2 | SEND Current Data: .06# and .14D<br>Remote was instructed to move to .20D (degrees) in tick 1 and it was well on its way (made it to .14D) when this tick, and its new data, came. When this tick happened, the pressure had already been increased to .06# to move the joint towards the local's position. | Send Current Data .26D.<br>.05# The local user continued to advance his position.<br>The local JPC was in the process of decreasing the pressure to match the local's 0# but it wasn't finished yet and the user's continued advance contributed to the remaining pressure. |
|  | Order JPC to move the joint to .26D.<br>Note:This will involve slightly higher pressure since the number of degrees to be accomplished (.26-.15=11) is greater than the number of degrees in tick 1 (.20-.10=.10) | Note the not accidental similarity already in the pressures (.06# and .05#). This is natural since both local and remote are accelerating against the inertia of a similarly weighted "body".<br><br>Remote unrestrained so no local positioning adjustment needed.<br>Order JPC to increase pressure to match remote (.06#).<br>Process these adjustment(s) for remainder of tick |
|  | Process these adjustment(s) for remainder of tick period. | period. |
| 3 | Send Current Data: .09# and .21D. | Send Current Data .40D.<br>.10# of pressure at local. |
|  | Remote was catching up but, now, .40D-.21D represents a bigger change required (from current position to demanded position) thus the pressure calculation logic for this tick will naturally generate a significantly higher pressure than in the previous tick to get the job done and to | Rapidly accelerating advance. For every action there is an equal and opposite reaction thus, at the remote, the pressure exerted to achieve the motion is the amount of pressure appropriate for the user to feel as resistance. However, the current pressure here is the sum both of the previous tick's adjustment up to the remote's |

-continued

| TICKS | Remote | Local |
|---|---|---|
|  | accurately represent the equal and opposite force of resistance to motion. | higher pressure and it's own internally caused increased pressure from the accelerating acceleration. Thus the pressure not only achieved the .06# demanded in the previous tick but exceeded it. |
|  | Order JPC to move to .40D. Process adjustment(s) for remainder of tick period. | Order JPC to match the remote's pressure of .09#. Process adjustment(s) for remainder of tick period. |
| 4 | Send Current Data: .22# and .34D Note responsively higher pressure. Tick 3 demanded more pressure to match the increased acceleration of the local thus it is significantly higher here. The increased pressure did its job and it is rapidly approaching the .40D demanded in the last tick. The speed of the remote's motion is continually adjusting to the speed of the local with each tick. Order JPC to move to .45D Process adjustment(s) for remainder of tick period. | Send Current Data: .45D. .09# Order JPC to match remote's .22# pressure. Process adjustment(s) for remainder of tick period. |
| 5 | Send Current Data: .19# and .39D. The pressure is in sync and the Degrees are on track (closing in) but there is a brick wall coming up in two more ticks.. Order JPC to move to .48D | Send Current Data: .48D. .19# Decelerating (.48D-.45D is less than change in earlier ticks.. No Order to JPC since pressures match. |
| 6 | Send Current Data: .18# and .43D. Order JPC to move to . 50D | Send Current Data: .50D. .19#. Order JPC to match remote pressure of .18#. |
| 7 | Send Current Data: .27# and .44D. Remote met resistance. Actually, it hit strong resistance at .44D. The pressure increased to .27# because of the impact and resulting back-pressure. This will be felt at the local end in the very next tick. How is the presence of remote resistance sensed in this type of embodiment? In this particular example embodiment there are no external pressure sensors with which to compare against the internal pressure to sense resistance immediately (though that is an alternative embodiment) and since the embodiment described in this example doesn't wait around to see if an exact match in position is achieved through a servo or other position approach process (as is done in other example embodiments above). An effective means to sense resistance quickly both at the remote and at the local (reviewing remote data) is to note that the minimum fraction of achievement chosen in this example for the previous tick was ¼ * (.50-.43) or 1.75D and only .44-.43 or .01D was achieved. Even if a poor choice is made for minimum fraction of achievement causing it to fail to sense the resistance in this tick, in the next tick, with even less progress, it would sense it.

Order JPC to match local's .51D position. However, since resistance has prevented ordered motion, in addition to the amount of pressure the normal equation would have calculated to move to the position over the time period, an additional amount of pressure is added algorithmically (it can be as simple as adding an additional 15% above the default pressure calculation each time progress is thwarted up to the joint's maximum power or as clever as a binary maximization approach to the desired pressure). Thus, in each tiny tick, the pressure, when motion is blocked, is increased, passed on to the local user, and | Send Current Data .51D. 19# Because of the minimum fraction of achievement not being met, the local knows resistance is keeping the remote from keeping up and it adjusts itself back to the remote's position. When failure causing resistance (any resistance that makes the remote fail to match the local) is encountered, the process for attaining the appropriately retrenched angle also provides the appropriate resistance during the tick.

When commanded to match the .44D of the remote, i.e. to move back .51D-.44D in, say, 3 ticks, the JPC will use the same kind of mathematical calculation used in other embodiments above to calculate the pressure required to attain the change in that allowed time. Thus the JPC might, in this example, calculate and change the local back-pressure to be .26# to move the local back to .44D. While the angle with respect to the center of the earth and the velocity to be reversed based on change in degrees of the last tick can be used with the other data to make very accurate calculations of the pressure required to place the joint at the correct angle, in these example calculations, calculated approximations based on distance to be moved and weight of the limb supported by the joint (stored in memory for each joint) are simple and profit from the self correcting nature of the same calculation being repeated in the following very short tick. That self correcting is further enhanced by the logic's means of bumping up the pressure in the next tick above the default calculation if the minimum fraction of achievement is not attained and a programmatic comparison assuring that the local back pressure is >= the remote's pressure. This calculated pressure both puts the joint into position and effects user felt resistance.

Order JPC to move back to .44D which will, programmatically, result in a back pressure capable of achieving that. |

-continued

| TICKS | Remote | Local |
|---|---|---|
| | if the local user pushes even harder, so does the remote. | |
| 7 | Send Current Data: .29# and .47D. The increased pressure moved past the .44 sticking point (even before the local finished backing up since the tick was so short). | Send Current Data: .48D .26 # moved the local back, so far to .48D. it might have moved it further back except that the user's muscles, already flexed in a direction in opposition to such a reversal, overpowered the pressure though the user, appropriately, felt it. And the user did give just a little in this momentary tick. The local user in this case is still a tiny bit ahead of the remote (even though the breakthrough at the remote minimized that). Had the local come out after the "break through" of the resistance behind (at a lesser angle than) the remote, the remote would have adjusted back to the local in |
| | Order JPC to move to .48D | the next tick. Order the local JPC to emulate the remote's .29#. |
| 8 | Send Current Data: .28# and .48D. | Send Current Data .52D .28# Continuing to apply his strength against the .26# resistance, the user has moved even past the initial point of resistance. Instruct JPC to continue pressure which now |
| | Order the JPC to move to .52D | agrees with remote. |
| 9 | Send Current Data: .27# and 50D | Send Current Data .52D .28 No motion this tick Order JPC to match remote pressure of .27# |
| 10 | Send Current Data: .27# and 51D | Send Current Data .52D .27 No instructions. |
| | Send Current Data: .27# and 52D | Send Current Data .52D .27#. The user continues to feel the .27# that the remote is supporting. |

Extended Motion Options: Note FIGS. 5–14.

In addition to normal walking, which, with the remote and local user on a flat floor, can be accomplished with joint control hardware already described, an additional development provides full 3-d mobility that allows the user to climb and stand on stairs or mountains that aren't there. The user feels the terrain as well as experiences the attitude/sense of balance, weight, impact, inertia, etc. that the remote experiences thus allowing the user to control the remote on complex topological terrain as naturally as he would if he were there. Although the user is suspended, he doesn't have the sensation of "hanging by something". Instead, when standing, he feels his weight pressing on his feet (as is appropriate) and, when "lying" on his back on a phantom bed, feels the pressure on his back, legs, etc. as is appropriate.

The angle of the body torso or other key body focal point(s) with respect to the center of gravity as sensed by the attitude sensor's at the remote determines the local user's attitude. In this example embodiment, the user equipment has attitude sensors placed on each side of the support bar where it attaches to the waist rotation ring. The remote equipment has attitude sensors operatively placed in the same position. Multiple attitude sensors can be placed all over the body to provide useful synchronizing information. However, when all the joint angles are updated simultaneously, it can be seen that, while useful, this is not necessary since, if the waist is in sync with the remote and all the other joints are too, then the attitude of each limb will be in sync.

Pitch Emulation: If the remote is falling forward, the local user will find himself rotating forward as the main rotating assembly (70 in FIG. 7) and/or the Tight Circle Rotator in FIG. 5) rotate. Both rotators control the pitch of the user and can be used together for rapid, realistic response. The optional Tight Circle Rotator provides faster rotation with less vertical inertia adjustment required of the vertical support cylinders 72 and 74). The vertical support cylinders move up and down to provide vertical inertia responsive to that experienced at the remote but are also used programmatically to offset errors in vertical inertia caused, for example, by the downward inertia of rotating a user (who is standing vertically) forward (to a lesser pitch). This adjustment is necessary to prevent an erroneous sense of falling, since the user is actually moved downward a small amount to accomplish the forward rotation.

Roll Emulation: Similarly, the user's roll is forced to emulate that of the remote. This is accomplished, in this sample embodiment, by the rotation of the support arm 76 in FIG. 7.

Figure 7:
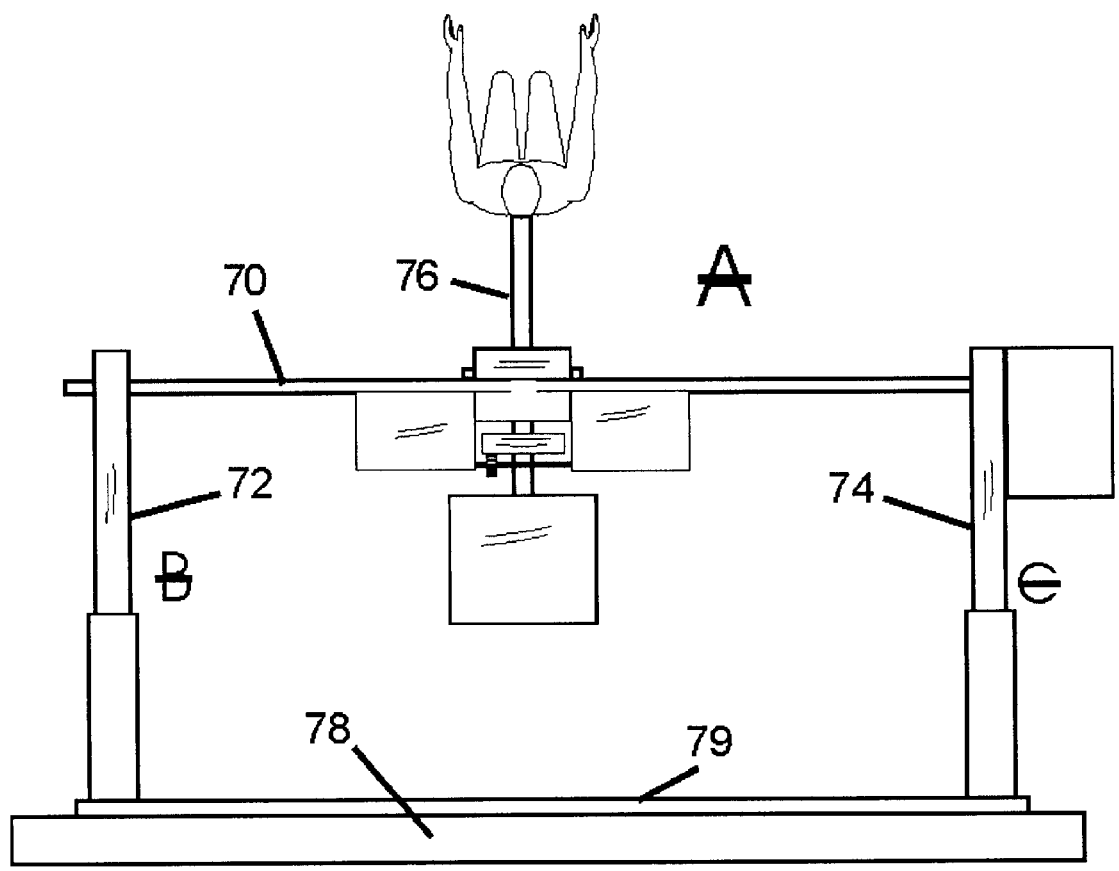
FIG. 7 is a top view of the supportive means for a person wearing assistive equipment.
Figure 8:
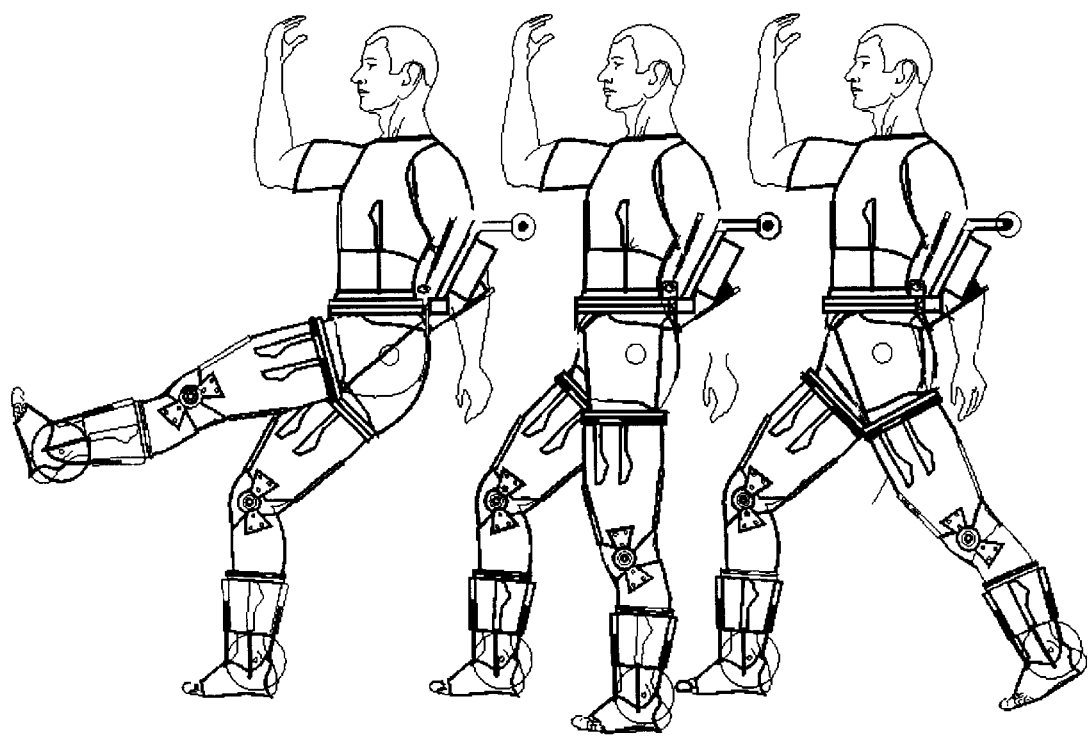
FIG. 8 is a side view of several positions of persons wearing the equipment.
Figure 9:
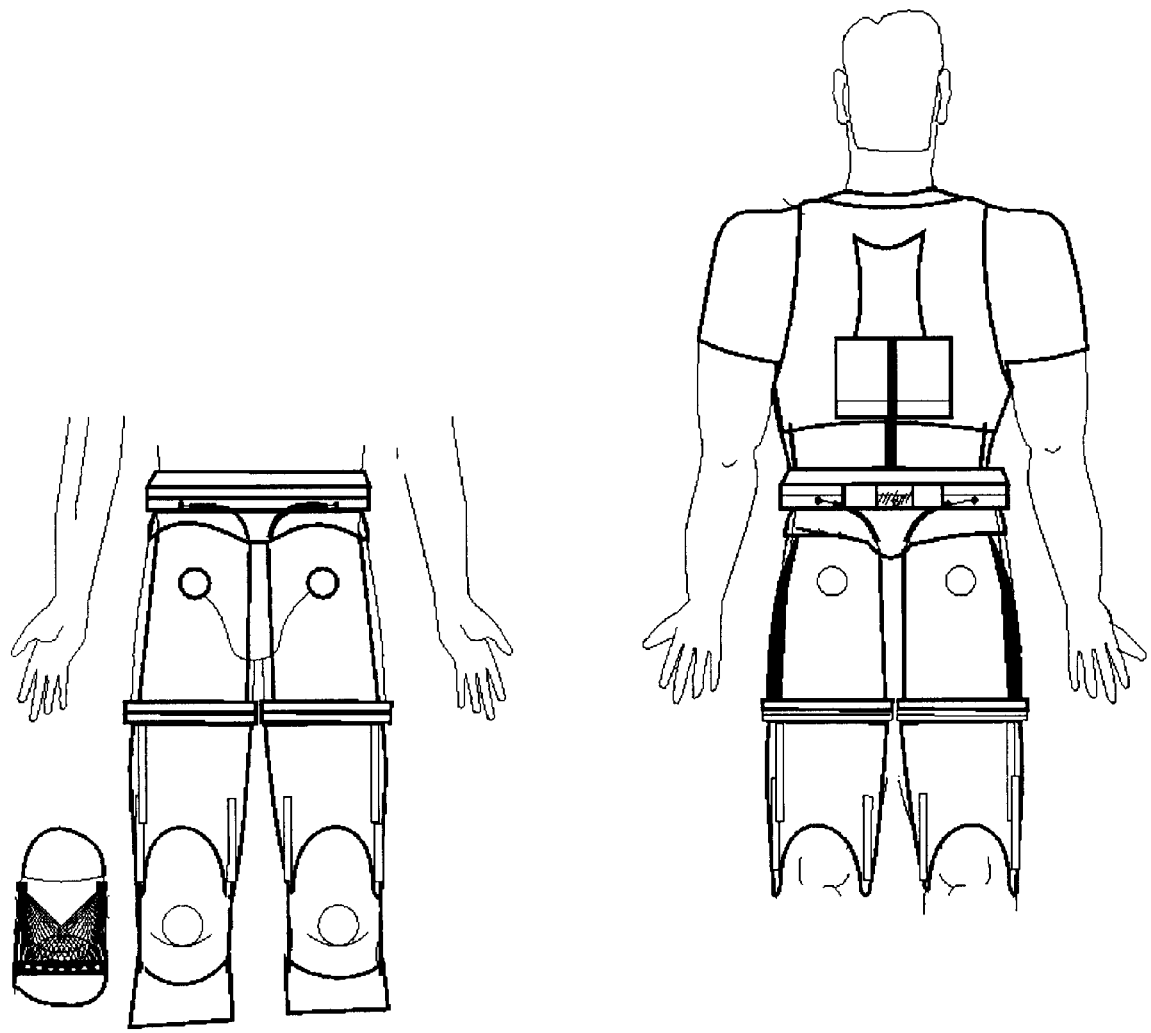
FIG. 9 shows a closer view of the mid-section assembly.
Figure 10:
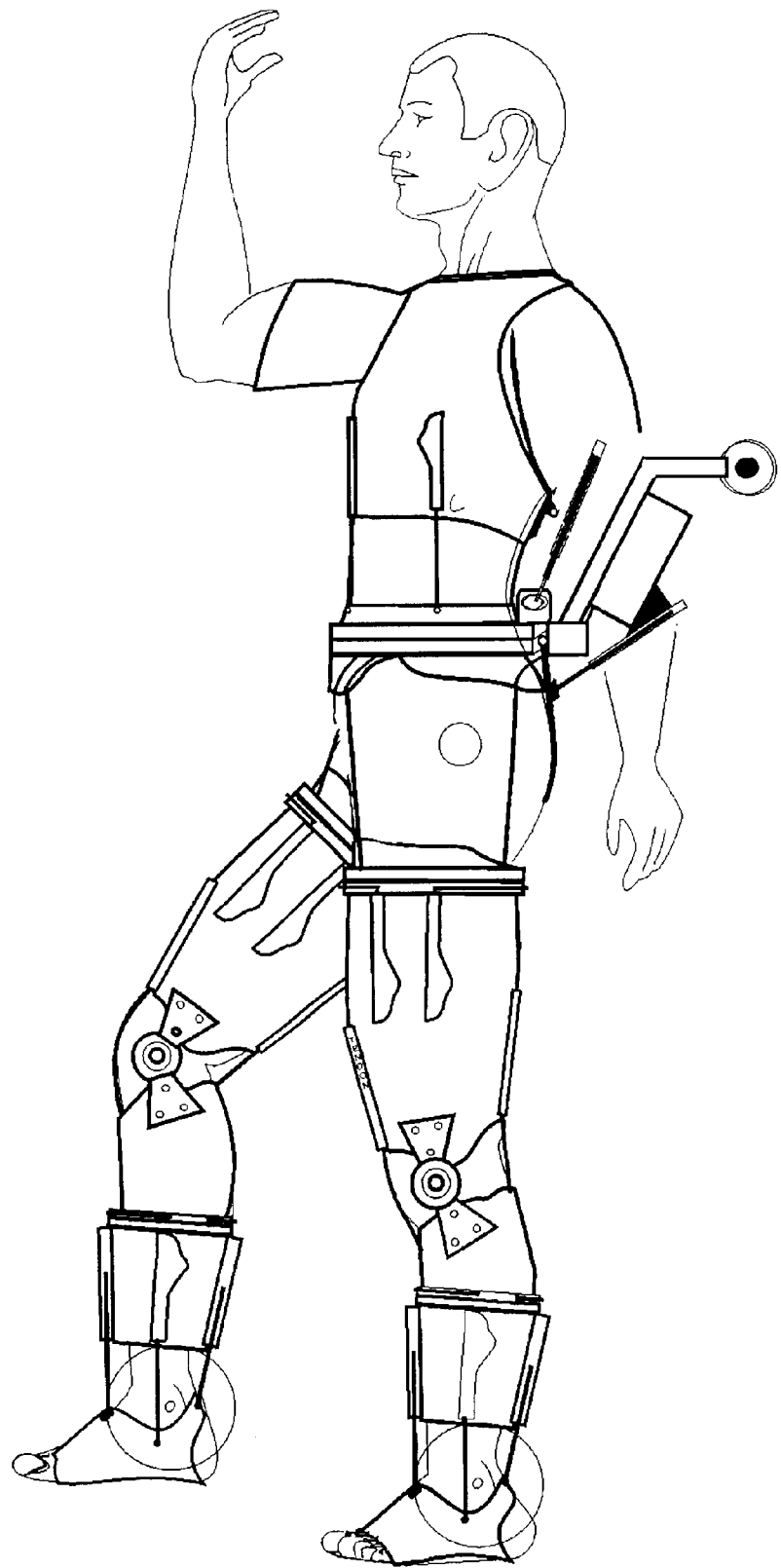
FIG. 10 exposes the support attached to the back for suspension from supportive means.
Figure 11:
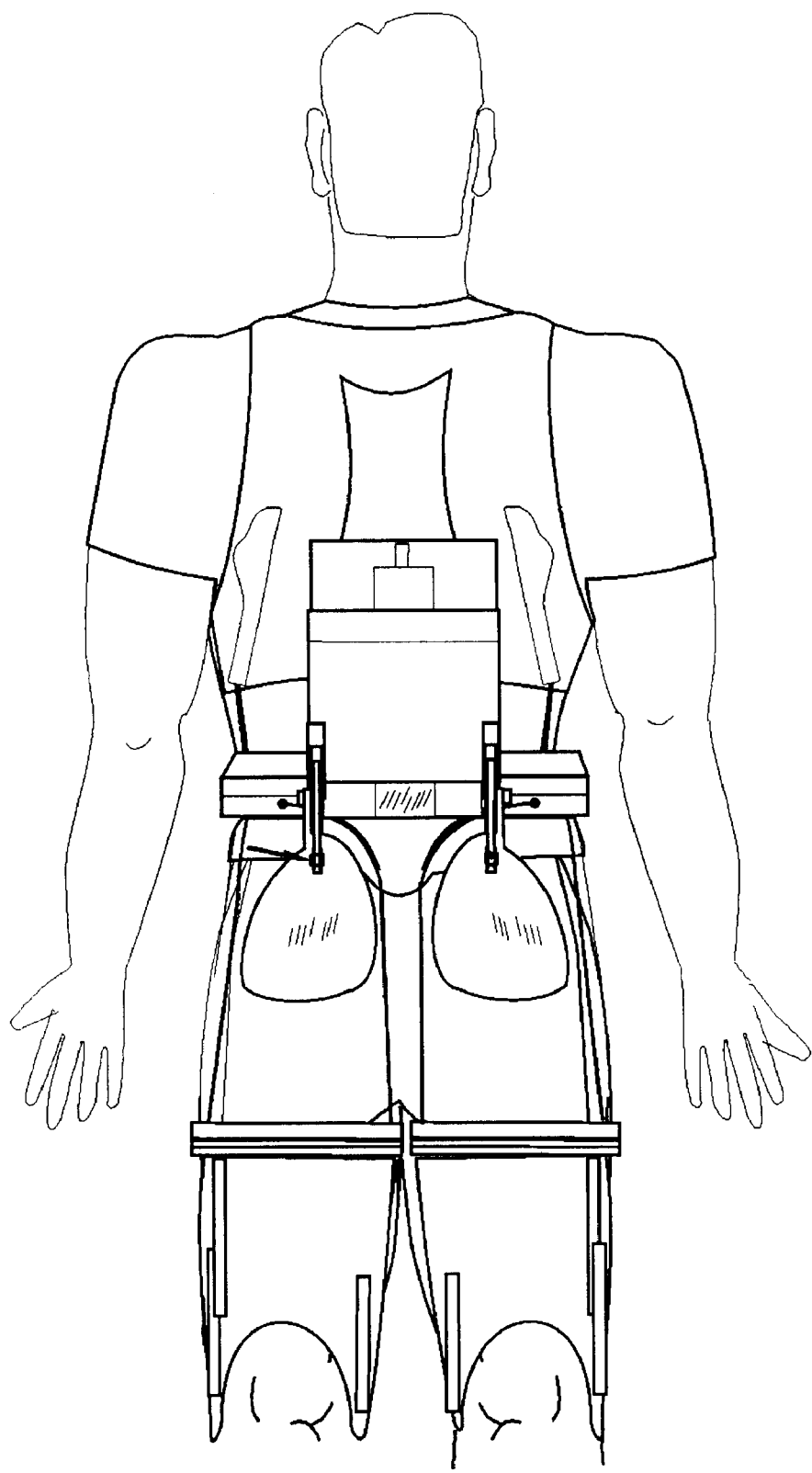
FIG. 11 shows an enlarged picture of the back assembly.
Figure 12:
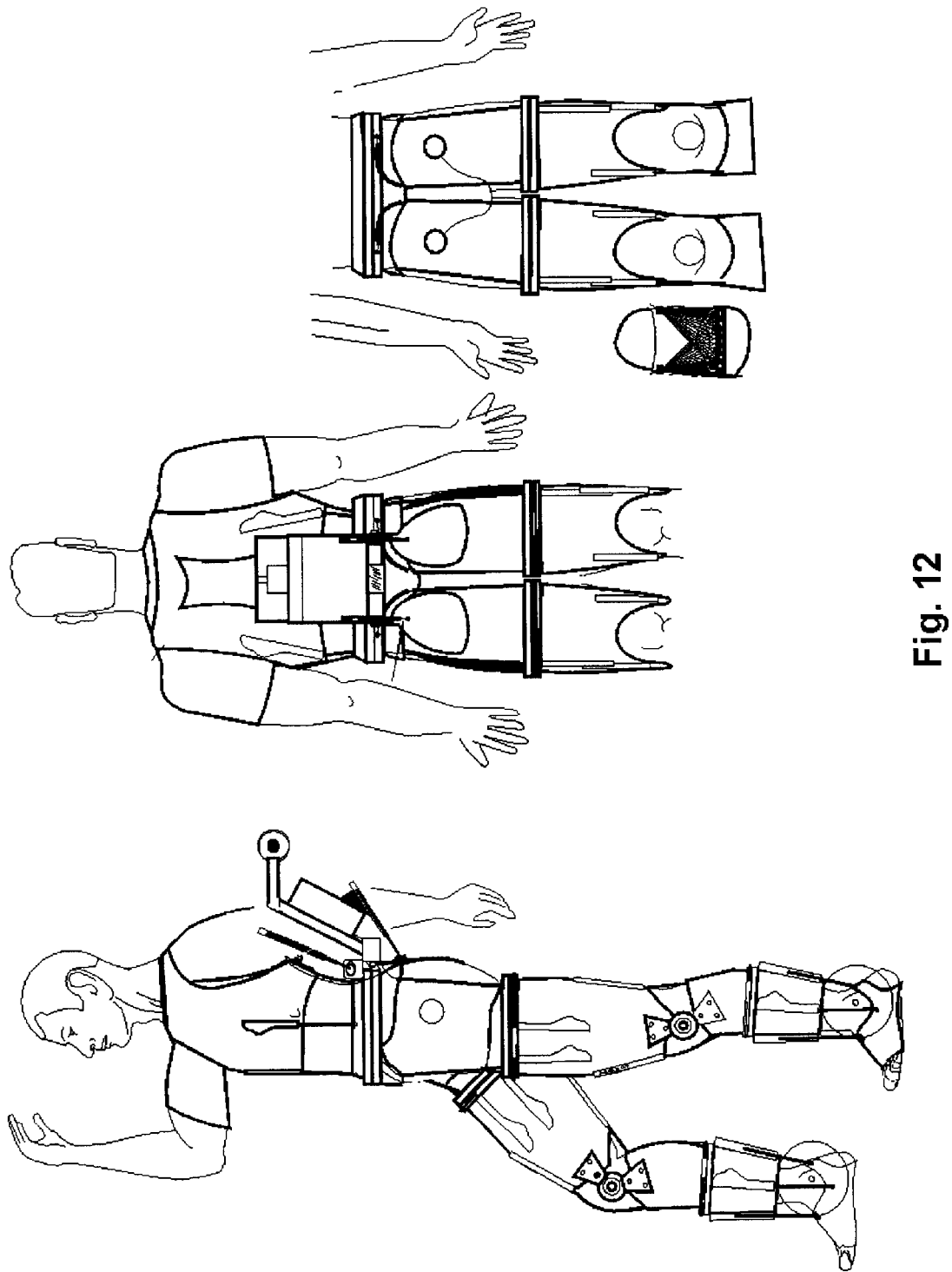
FIG. 12 shows more detail on the assembly.

Horizontal Acceleration and Motion Emulation: The moving platform 78 in FIG. 7, provides this responsive motion in response to correlating motion sensed by body attitude and acceleration sensors at the remote.

Yaw Emulation: The user's yaw can be adjusted to match that of the remote using the turntable 79 in FIG. 7. This provides the last dimension of full inertial perception matching that which is being experienced by the remote equipment.

Figure 5:
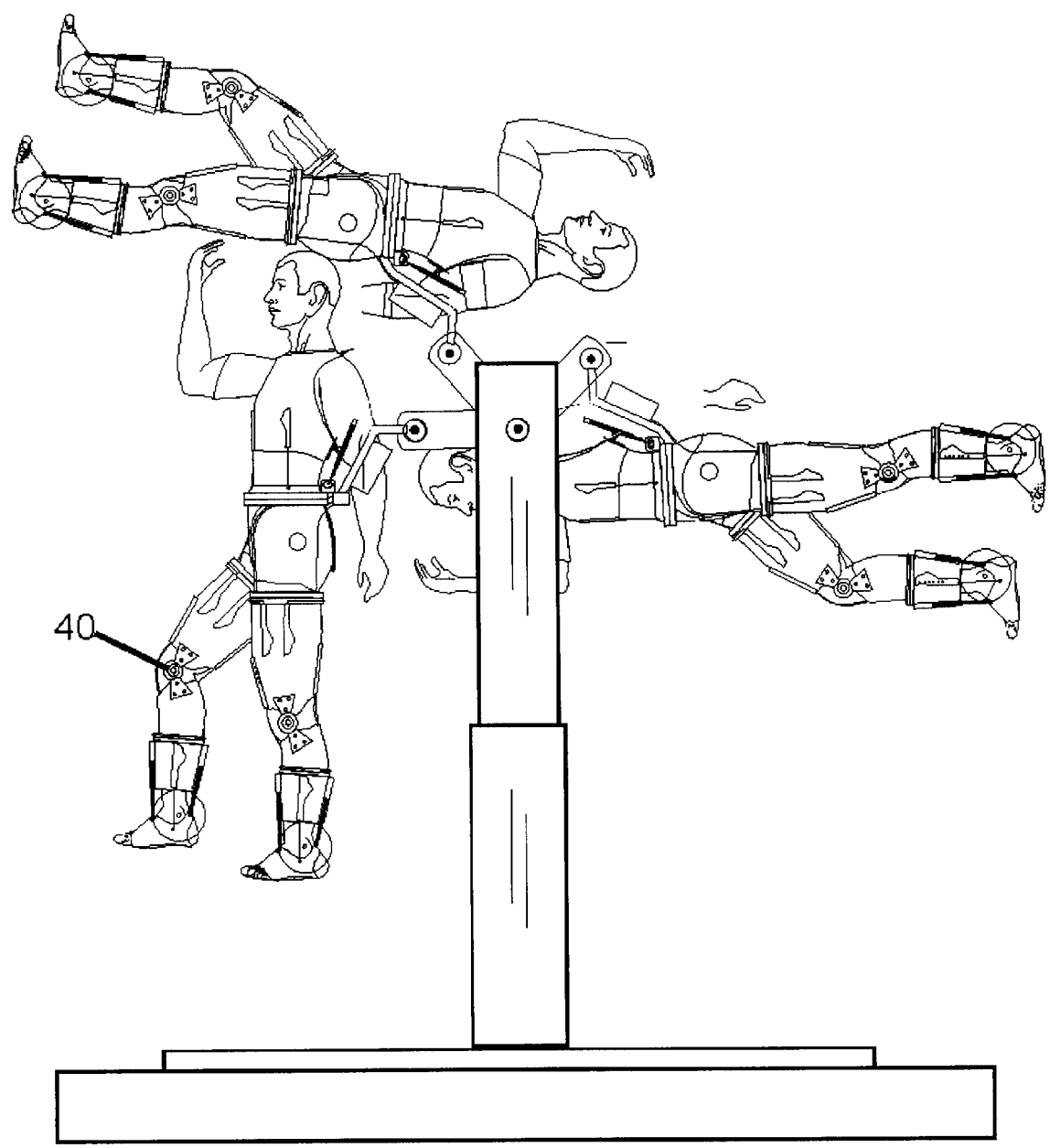
FIG. 5 is a side view of a supportive means for a person wearing assistive equipment.
Figure 6:
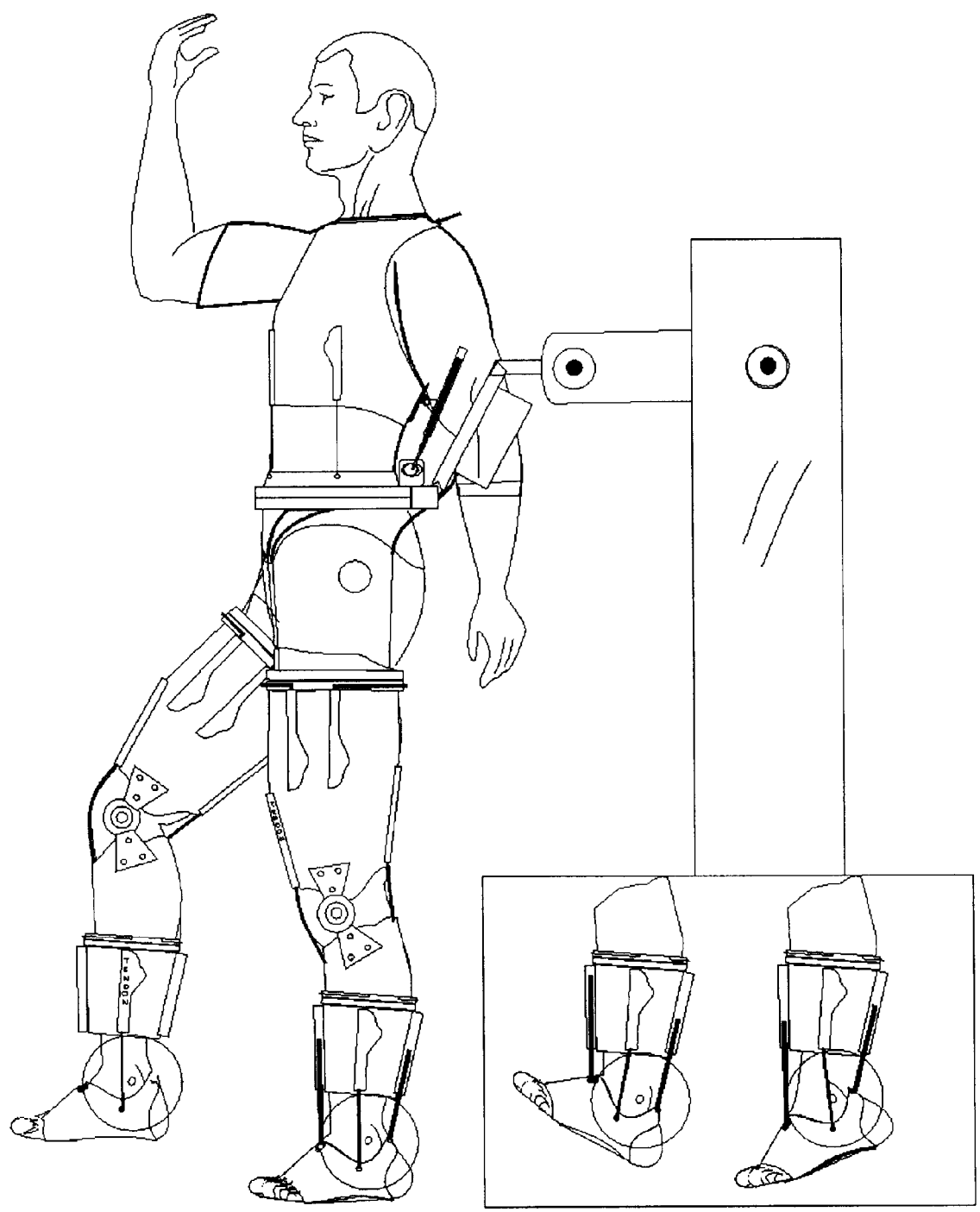
FIG. 6 is a close view of FIG. 5 with foot assembly detail.

Some elements of the user's experience take some thinking to get used to (not by the user who feels natural but by an observer to whom it appears that the user is performing oddly). The user is supported on a horizontal set of bearings around his waist (FIG. 5.) In this example embodiment, the lower side of the bearing set is connected to the support arm on which all his weight is ultimately supported (but not felt as explained below). When the user is standing with the remote's feet on the ground and turns his upper torso to the right (increasing yaw) at the waist, the user's feet remain stable and the torso turns on and with the upper bearing looking quite natural. If, however, the remote is hanging on a limb with its feet dangling and the user twists his hips to the left (decreasing the yaw of the hips and legs), the user would say that he twisted his hips to the left since his visual perceptions come through the visual apparatus reflecting the world the remote is in. He would actually "see" his legs and hips rotate to the left against the remote background. However, an observer standing a few feet away from the local user would say that he did the same thing in both exercises i.e. twisted the upper torso to the right while the lower body was not rotated (though he certainly would have kicked his legs a bit, etc. in the second example where the feet were unencumbered). The outside observer would be correct, but the effect on the user reflects the operation correctly. His perceptions are also correct in that, relative to the rest of the body, his lower body rotated precisely as he "saw" and felt.

When the user puts his foot on a virtual step (that exists only at the remote location) and pushes himself up on it, his upper torso doesn't go anywhere but the foot is "pushed" against the resistance of the ground or step, etc. at the remote. This resistance felt by the user is nothing but back pressure on the ankle, knee and hip tendons, etc. leading up to the support. Also, if the remote worn sensors record significant G forces as a result of jumping up on the step, they can be emulated at the local with responsive motion at the local. For example, if the remote, climbing the step aggressively as instructed by the local user caused the sensors at the remote to sense a vertical change of C in a time period T and that resulting G force is significant enough to emulate (i.e. significant enough to be in the range felt by the user), the support columns 72 and 74 in FIG. 7 would raise the user up by C in the same period T i.e. causing the user to feel the G's. Similarly, communication of G forces to the user in other dimensions are accomplished by moving the platform (G) and the turntable (F) in FIG. 7. In periods of low G effect in any dimension, the controller of that dimension can gently (at a G below the user's ability to perceive) return to a more central position allowing for infinite G emulation. The user feels perfectly natural climbing the steps or mountains until he takes of his visual display and sees that they are not there.

Figure 13:
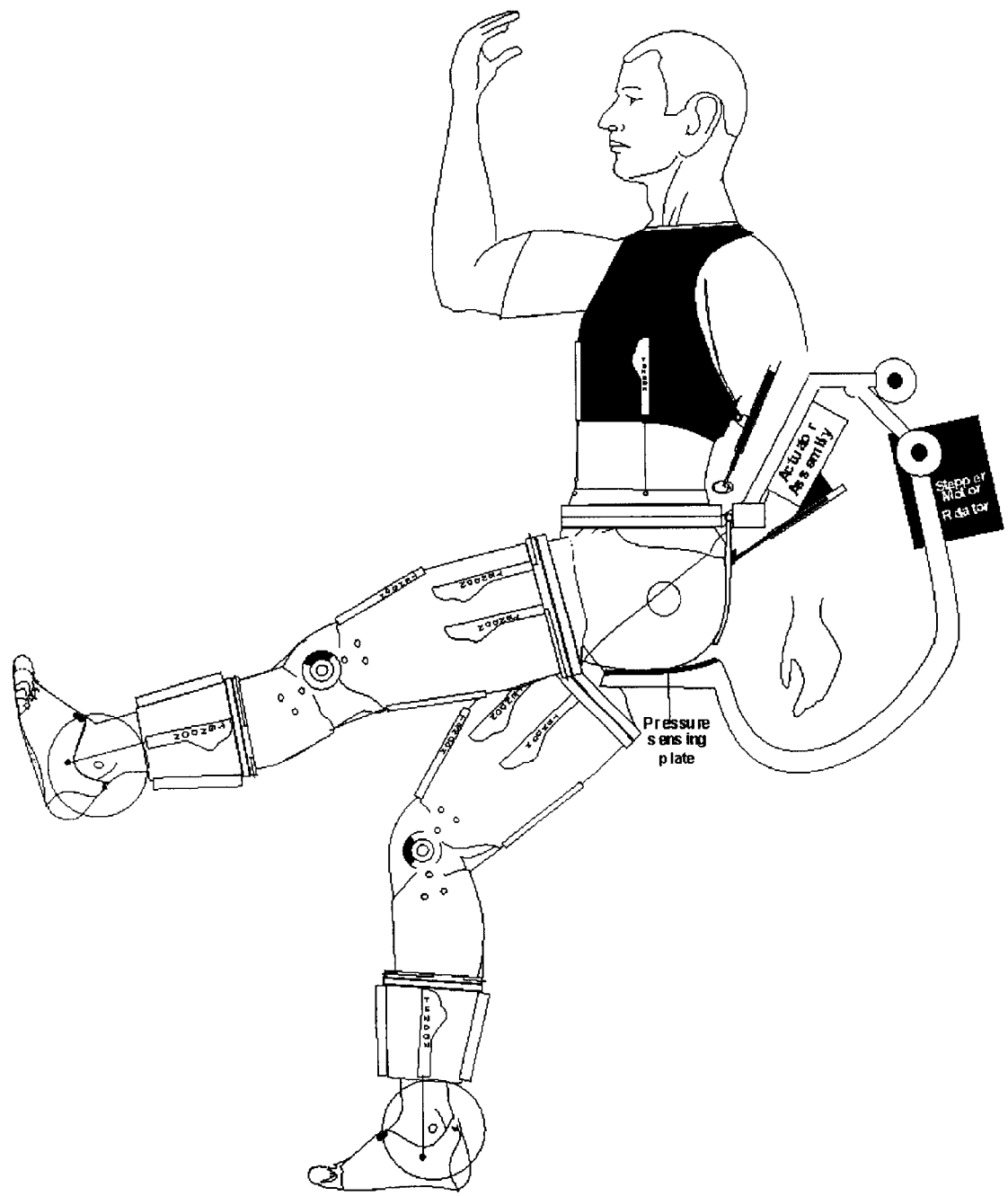
FIG. 13 shows an additional piece to the assembly suspension equipment for support while sitting.
Figure 14:
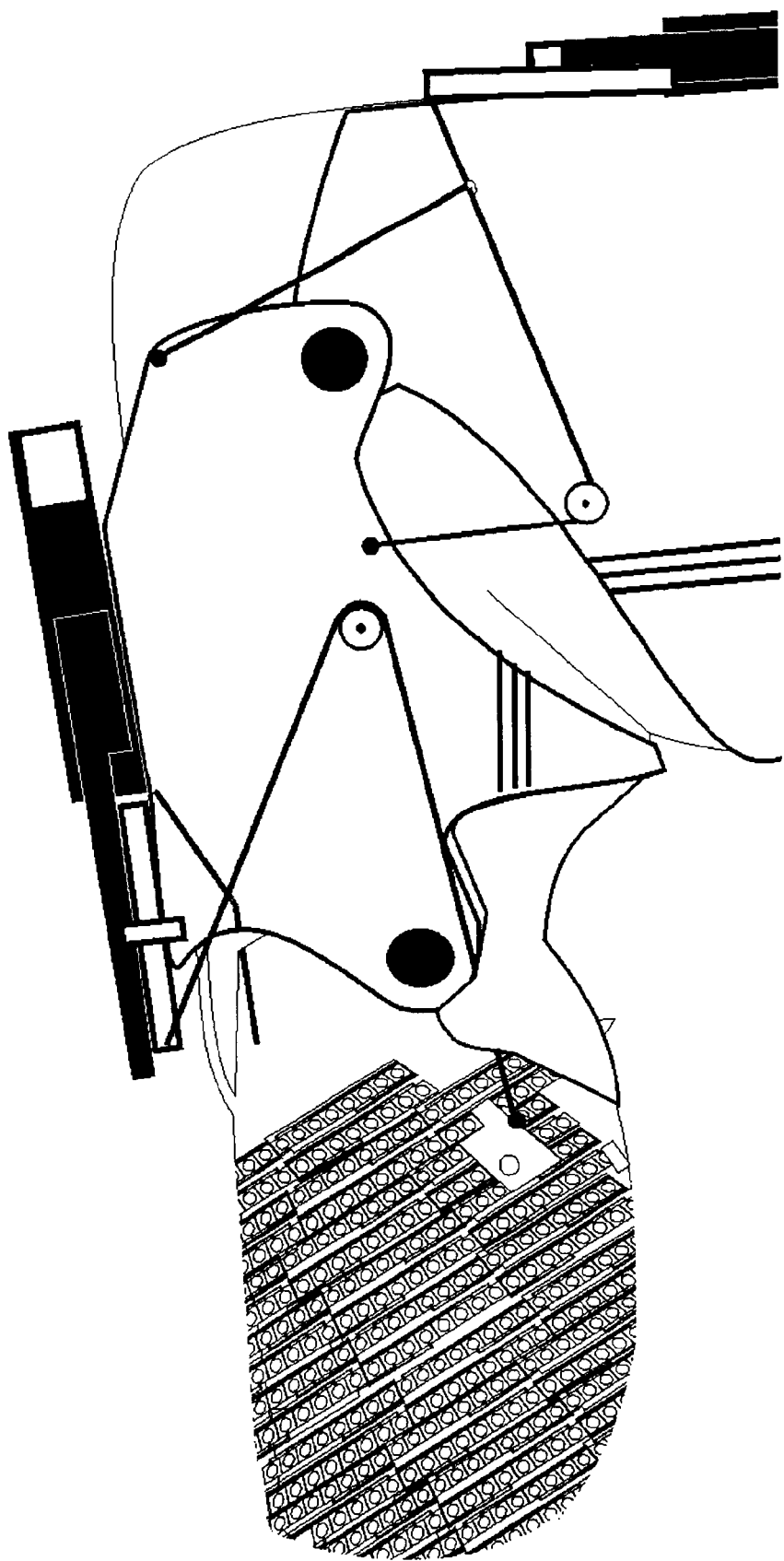
FIG. 14 shows a side view of a finger bent wearing assistive equipment with a sensor array.

How is weight supported? For example, how does the operator feel the weight on his feet when he is walking when he is actually hanging by his waist? Doesn't the weight on his waist hurt? How do the feet feel the pressure and impact of steps or hills when they are actually hanging mid air? The tendons themselves throughout the array of body controls provide support where needed. When standing straight up, for example, when initializing a session, the tendons in the remote and the local are synchronized and thus are operatively (except for adjustment amounts explained later) retracted to the same length thus the local user is literally standing on the foot/shoe. This places all body weight, while in this standing position, off the waist and places it on the feet when standing. This is effective because the ankle tendons and/or pistons "pull" the foot towards the lower leg transferring the load to the lower leg. The knee tendons continue the transference of load precisely as is appropriate pulling the lower leg vertically along the line of load to the thigh. The molded thigh "armor" is similarly pulled towards the lower waist bearing completing the transference of the load from foot to machine supported waist bearing. Thus, the load, while ultimately supported by the lower waist ring is actually felt to be and operatively is on the foot and legs where it should be. Additionally, the back support piston keeps and supports the proper position of the upper torso. Even in positions where less weight is supported by the lower portions of the body, this provides upper body weight support. For support while the user is basically on his back, again, the waist and leg tendons do the appropriate job of placing the joints in the correct position and that supports the body. However, there are additionally and optionally posterior hip supports shown in the center drawing of FIG. 12 from the rear and visible in most of the standing illustrations. Finally, as an option for those few circumstances where the user would be sitting down on the job for substantial periods, FIG. 13 illustrates additional posterior support for the user. This additional support is not necessary since the tendons supporting the user will perform the same positional support function but an additional level of comfort is possible and, of course, the user would feel the touch of the phantom support in this otherwise uniquely uncontacted portion of the body. An additional powered axle, not illustrated, just anterior to the support pad adds an additional range of support positions for situations where less extreme leg contraction (knees not as far up). The amount of support is determined by the stepper motor or other mechanical means at each axle on the support arm shown. While the amount of rotation can be known programmatically by analyzing what other weights are supported by other points, it is, alternatively, a relatively simple matter to place pressure sensors on the remote in the appropriate posterior location and to have the local apply the same amount of upward pressure as measured by the pressure sensors on the local posterior support. This, also, is a non-critical additional level of support since the tendons and other supports provide adequate support for most applications.

Because the joints in this example embodiment are 4 control, multi-dimensional, the user can feel, for example, more pressure on the right side of his feet when "walking" on a positive roll inducing terrain (the remote is resisting a leaning to the right caused by the angle of the terrain by placing more weight on the right side of the feet).

If the user dives forward horizontally, he is rotated forward by the large rotator bar (A in FIG. 7 which is the natural local response to remote attitude sensor data received) to place him at a pitch closer to horizontal. This reduces his altitude by Y (a vertical amount) because of the easily calculable downward "Y vector" component of the same rotation that effected the desired change in pitch. The support columns increase the height of the support bar, and thus the user, by Y (in tiny cyclical or tick based steps) thus negating the rotation induced downward inertia on the user side so that the user's experienced inertia is effectively the same as the remote's. The platform on which the support columns rest can also be moved backwards to provide the sense of being launched forward in the dive. The amount of the platform's movement X over time T is operatively identical to the forward motion of the remote as measured by it's own attitude sensors except that it is in exactly the opposite direction (−X). So, as the user jumps off, he feels increased pressure on his feet and legs when he pushes off.

Then, as the remote incurs the noticeable initial G forces of initial acceleration down, the user feels the inertial "light stomach" as he "flies" because that initial noticeable acceleration from vertical stasis is reflected by the attitude responsive decrease in altitude effected by the lowering of columns B and C at an acceleration identical to the negative G's sensed at the remote. As he flies momentarily, his weight is offset by negative travel (lowering) of the support columns) providing a sense of weightlessness. Of course, if he jumps off a high cliff, the vertical column adjustment will have to transition down to a stop as actual sensed G's decline. If this happens, his weight, though he is positioned horizontally, will be supported evenly by all the body armor. Not surprisingly, he will feel no weight on the soles of his feet any more since the hip, knee and ankle tendons/pistons at the local match the pressures on the remote.

It can be seen even in this example embodiment that, for example, when a user lies down on a virtual bed that the load of the user's body will be evenly and appropriately spread out over all the body armor. The optional piston in the back of the waist, replacing the anterior waist tendon, provides more rigid support in any dimension while effecting smooth response of the waist bearings to twisting of the waist. The joints themselves support the limbs when it seems that the user should feel strained by the pull of gravity while hanging in a horizontal position. For example, the anterior hip tendons retract to pull the thigh horizontal to match the angle of the remote. The knee tendons and ankle follow suit providing support and making the body seem to lie on a surface that exists only in a far away place. Additional posterior supports, already described, provide additional comfort support and sense of touch.

Automatic Adjustment and calibration of local equipment to local user body and local equipment to remote equipment: Minor adjustments for different user bodies and for the same user over time will certainly have to be made and these may be in the form of program aided joint tendon adjustments "hiking them up" until the weight is distributed ideally and the user is comfortably "standing" on his feet with the feet and legs supporting all his weight.

How will the program know how much to hike what and how will that affect the normal comparative pressure of the remote and local joints? There are any number of ways which can be used individually or in combination.

1. Manual operator adjustments at the keyboard tightening/loosening joint tendons by adjusting tendon or/piston back pressures until it feels right to the user in various positions. This is fine when comfort is all that matters but other options can be more exact for delicate work of importance.

2. With the local user standing in the shoes, make adjustments based on known or measured data. Known data would include the actual weight of the user. Alternative measured data would include the increased weight on the main support columns when the user mounted as measured by either weight sensors or back hydraulic pressure on the support columns. The static standing load on the local's 4 ankle tendons will be operatively equal to the weight of the user plus the weight of the lower leg equipment plus their normal back pressure used to keep the joint equipment tight. Similarly, the knee and hip tendons, when standing, have about the same amount of back pressure varying between joints by the different minimum back pressure needed to keep various joints tight.

3. With the local user standing in the shoes, hike up (i.e. retract) and thus tighten all lower body tendons to the maximum experientially firm and comfortable recorded back pressure which is used to keep the tendons taught and the joints tightly together. Then adjust the ankle tendons until they are supporting exactly the weight known to be that of the local user For auto calibration and adjustment the system uses, while the user is standing vertically in the equipment, both programmatically available and measured data of load supported by the total of the 4 ankle tendons. Programmatically available data includes the known weight of the user and measurable includes the change in weight of the equipment when the user mounted it as measured by pressure sensing means on support column's A and B or on the changes in the pressure required to support the columns in the current test position after mounting. If the weight on all 4 tendons combined (as measured by the pressure required to move the tendons to the starting postion) is less than the weight of the user plus the known weight of the lower body equipment, the equipment programmatically and gradually increases the ankle tendon's back pressure without changing the angle of the joint (by retracting each of the four tendons by the same amount in each adjusting cycle) until their combined load (back pressure) exactly equals the user's body weight plus the known weight of the lower body equipment. Then the program directs the equipment to tighten the hip and knee tendons until the combined weight supported by the 4 ankle tendons only equals only the user's body weight. (at that point your are, by definition, supporting his precise full weight and the equipment is "weightless").

4. Based on pressure sensors, optionally on the fly. For example, sensors on the soles of the remote foot would determine the amount of back pressure on the local ankle tendons/pistons and so on up the local user's leg. Pressure sensors on the remote either in line with the "bone" or at contact points report how much downward pressure is being applied to the foot, etc. Thus, at the local, the reverse force is effected. For example, if the anterior foot sensor, which is calibrated and calculated to measure the downward pressure on the anterior of the ankle, measures 35 pounds of downward force, the anterior tendon at the local will increase it's pull in the opposite direction (upward) by 35 pounds. Sensors at the remote knee joint would drive the composite back pressure of the knee tendons (not necessarily applicable in embodiments where an external knee joint is used as shown in FIG. 5 40 and other figures). Similarly, sensors at contact points or in line with the remote "bone" above the knee measures the amount of weight to be reversed at the local by the 4 waist-to-thigh tendons as a group (on each leg). When the user is at an angle, ex: horizontal, that places little or no weight on the feet, knees and thighs, the user will feel the appropriate reduction of pressure continuing the effective emulation of the remote experience. Even when the user is essentially vertical but the remote is temporarily weightless, ex: when jumping up a step, the inertial adjustments of the main columns will naturally reduce the pressure on the legs and feet by reducing the effective weight of the user momentarily. Together, the responsive back pressure and inertial controls provide an effective emulation of remote conditions even in complex motions. Programmatic adjustments for the weight of the local equipment make it "weightless".

This continuously-responsive-to-measured-pressure process is not only applicable to static calibration but also to on the fly calibration. Beyond calibration itself, it is also the method used in this example embodiment for the local equipment to effectively control the pressure on each tendon to produce a true reflection of the pressures, weights and impacts "felt" at the remote while the user is using the equipment.

Thus, when the user is temporarily weightless or reducing the weight on his feet by hanging from a virtual tree limb, etc. the sensors at the remote and these responses at the local see to it that the amounts of pressure on the feet, thighs, etc. are felt as they would be if the user were actually performing the robotic acts in place of the robot.

In actual practice of synchronizing actuator series' there is often a concern that such adjustments would put the user out of balance by pulling, for example, the anterior ankle tendon too much and the posterior tendon too little or not at all. However, each tendon at both the remote and local has a programmatically supplied stabilizing pressure stored to keep the joints and tendons tight. When tightening adjustments are necessary, we simply change the stored value of the back pressure to a higher or lower figure. All subsequent calculations use the now adjusted back-pressure in their calculations. Then, when the local user is operating and, for example, the current weight on the remote ankle is 80 pounds, the program adds the 80 pounds to the composite ankle reverse (now upward) load at the local which includes for each tendon, the fixed stabilizing pressure and each tendon's share of the 80 pounds of actual load. But what about the angle of the joint? The angle is unchanged with the "hiking" or load burdening since all 4 tendons are tightened simultaneously the same number of degrees in the tightening process. There will be, of course, some applications where the tendons will not be completely symmetrical making a tendon more or less efficient (at accomplishing an angle change for a give number of gear turns). These are accommodated programmatically in the adjustment calculations giving extra turns for less efficient tendons. Also, pressure sensors can be added on the local equipment (in addition to or in lieu of the known pressures on the tendons) to help monitor the effective pressure applied to the local.

After calibration adjustments are made, the local must remember the starting positions of each actuator because it is this position that is considered in sync with the remote. Thus if, when the local and the remote's joints are in angular sync, the user's tendon x is 4 gear clicks tighter than the remote, the local, in adjusting to the remote and in sending data to the remote will, until the tension on the joints is adjusted again, add and subtract that value (4) respectively from the value it would ordinarily use to allow this simple adjustment technique. This automated adjustment is most easily accomplished with the availability of and independent measure of joint angle (in addition to the gear position). Although angular graduations can be drawn on the joints themselves and be viewed in this or any number of other ways to be entered at sync time as keyboard data, adding angle sensors to the actuator assembly is a cost effective means to provide this data automatically in real time to support automatic adjustment of the equipment to the user's body and to the remote in it's current position (since even perfect equipment settings vary and tendons stretch over time).

Additional Gear:

The user's neck and head can be controlled with similar means as the other joints as described above. However, in an alternative embodiment of the current invention, the user's head and neck can be treated as an exception to the rule in a couple of ways. Typically, the position of the remote determines the position of the local for all joints. (Though the local user directs the remote, the user is forced to assume the position and load that results at the remote as if he were there.) The neck and head can, however, be treated as an exception allowing the local's head position to always determine the remote's head position. The upside to this is that only the remote needs to have angle emulating actuators leaving the local user's neck unencumbered. The remote is encumbered, of course, but they never complain. Both approaches are functional means to use the current invention. Simply by wearing attitude and motion sensors on the local user's head that measure pitch, roll, yaw, velocity, acceleration and locational coordinates operatively identical to those worn on the remote and with a known relationship to others worn on other parts of the local body or support equipment, the synchronizing of the neck and head of the remote and local can be effected without the user having to wear anything binding around his neck or head.

The body support assembly itself, because of its simultaneously unified response to everything remote, communicates not only remote motion to the local but shock as well. Another logical addition to this that is understood and reflected in the current embodiment is the addition of touch sensations ranging from lighter (than sensed by the support assembly) impact to tickling. These sensors associated with delicate touch can be accomplished with the addition of sensors at the remote and reproducers at the local. The local can reproduce many sensations with mini voice coil reproducers capable of reproducing delicate sensations as well as doubling as micro-impact actuators for delicate but impact related sensations. Or, for less sophisticated applications, microactuators can produce some of the same results.

The remote can cover areas where touch sensitivity is important with a thin surface matrix of micro-cell semiconductors whose conductivity is modified by sound, vibration and impact. Each acts as a tiny microphone picking up a wide variety of vibrations (from long wave length tremors and bumps to short wave length tickling as increased conductivity with discernable frequency. At the local, mini voice coils or other physical signal-to-motion converters in a similar matrix reproduce the signal captured at the remote at the appropriate location thus allowing the user to feel at a more delicate level.

The remote's strength could be a multiple of that of the user by intentional design. In this case, the resistance pressure at the local site is a programmed fraction of the resistance levels at the remote allowing full feeling and proportionate responsiveness but superhuman strength as well. Proportional preplanned disparity in size between the local and remote would also allow for a much larger robot (in addition to being stronger).

Similarly for miniaturization, the ratio could be reversed such that the back pressure is a multiple of that being exerted at the remote (perhaps in a very small but proportional robot) giving the user a feel of the capabilities of the remote as a reflection of a normal human load. Limited only by the precision of micro-robotics, the remote could be millimeters to inches instead of 5 to 6 feet tall.

It is a short step from operating and feeling in a virtual world through a computer operating a remote robot to operating and feeling through a computer a virtual world operating a virtual robot. From the user side, there is no difference. Instead of communicating through a computer with an actual remote robot encountering a physical world, the user's local computer is actually connecting to a robot acting in a virtual world. Thus the current invention provides an apparatus and process allowing the user to operate with all the abilities as described above but in a completely virtual environment rather than directing a remote physical set of robotics equipment. This includes the user swinging on virtual tree limbs, shaping and tooling virtual objects for later automated production and climbing in and testing equipment that has been designed in and exists only in a virtual environment that supports the interaction of the robot with the virtual environment like the one documented in the patent "Rapid Setup Universal Simulator Predicting Complex Physical Outcomes".

Having described the invention, modifications will be evident to those skilled in the art without departing from the scope of the invention as defined in the appended claims.

What is claimed is:

1. An apparatus for automatically resizing robotics equipment to match the stature and density attributes of a desired personality comprising:
   telescoping "bones" are either threaded to lengthen or shorten as one of the two elements rotates or expanded by other means; and
   motor or actuator means expand or contract the "bones"; and
   weights mounted on the outside of the bones, typically starting at the mid-point can be moved by rotation on a thread external to the outside tube of the bone or, alternatively, dense weights inside the inner tube are moved along the length of the bone to move the center of gravity of the bone and thus, as a group, they determine the center of gravity of the remote robotics; and
   motor or actuator means to move the weights; and
   processing means to capture from remote sensing devices or direct entry the attributes to be emulated and issue the commands to the above motors/actuators which are operatively connected.

2. A device for supporting a person above the ground in a fashion allowing the person to have wide bodily mobility without encountering the interference of the supportive equipment comprising:
   a primary support bar connected at one end to the user's external body support assembly, typically from the lower back, allowing free movement without the user bumping into the support bar and, at the other end, to the motion and attitude control means; and
   motion and attitude control means bearing, via the connected primary support bar, the weight of the user comprising:
      a roll control mechanism controlling the roll position of the user by determining the rotation of the primary support bar with a rotating stepper or other power means; and
      a primary pitch control means operatively connected to the primary support bar rotating the primary support bar, and thus the user, to a desired pitch position; and
      computing means to direct the motors, actuators or other powered means to move the pitch and roll components to the proper locations.

3. The device for supporting a person of claim 2 further comprising:
   an additional powered swivel on the primary support bar close to the point of attachment to the user's body support equipment directed by the computing means to provide, in addition to or in lieu of the aforementioned primary pitch control mechanism, to provide a pitch rotation with a much shorter radius of rotation and thus much less undesirable vertical or horizontal travel when simple rotation is all that is desired.

4. The device for supporting a person of claim 2 further comprising:
   a vertical control apparatus, normally operatively connected to the primary pitch bar and raising/lowering that assembly, along with the user as directed by the computing means.

5. The device for supporting a person of claim 2 further comprising:
   a yaw control device upon which the aforementioned assemblies rest, normally connected to the vertical control apparatus, which rotates to change the relative yaw of the user.

6. The device for supporting a person of claim 2 further comprising:
   an X,Y control device upon which the aforementioned assemblies rest which moves the entire assembly along the floor or on a supported track or other support device above the floor to provide inertial feedback to the user of travel along the plane of the floor.

7. An external apparatus for controlling a human, animal or mechanical body, comprising:
   a plurality of body control elements attached to or in effective contact with a body part for stabilizing or mobilizing the body part;
   a plurality of connective media operatively connected to the body control elements for pulling, pushing, twisting, rotating, or any combination thereof, the body control elements;
   an actuation means operatively connected to the connective media, the body control elements, or any combination thereof, for applying pressure to, moving, or any combination thereof, the body control elements; and
   a controller means operatively connected to the actuation means for directing the actuation means to acquire for the joint a currently desired position, apply a currently desired pressure, or a combination thereof; whereby the body can be stabilized and mobilized without the necessary requirement of external joints or support bars.

8. The external apparatus of claim 7, further comprising:
   a plurality of active connective media which replace the functions of some or all of the connective media, said active connective media being capable of additionally providing the actuation means by self-contraction, expansion, or any combination thereof, in response to a stimulus or empowerment.

9. The external apparatus of claim 7, further comprising:
   a computing means associated with controller means for directing the application of pressure to, or effecting the movement of, or any combination thereof, a joint on a desired axis or set of axes.

10. The external apparatus of claim 9, wherein:
    the computing means effects the effective synchronization of multiple joints in a coordinated action or set of actions; whereby
    the multiple joints are controlled in a synchronized fashion causing multi-jointed limbs or the entire body to maintain a synchronized overall position.

11. The external apparatus of claim 9, wherein:
    the computing means directs said actuation means to direct the joint through a predefined or calculated path over the course of joint rotation; whereby
    the joint can be directed through a preferred path or, potentially, even around a moving or non-rigid axis which can prevent opposition to a joint's natural rotation.

12. The external apparatus of claim 9, wherein:
    the computing means is operatively connected to the actuation means, a joint position sensing means, a pressure sensing means, or any combination thereof.

13. The external apparatus of claim 12, wherein:
    the controller means can monitor and be responsive to actual positions or pressures or a combination thereof, provided by at least one of the joint position sensing means and the pressure sensing means.

14. The external apparatus of claim 7, wherein:
    a plurality of actuation means coupled to connective media are placed near the joint to actuate the joint in directions reflective of each desired axis of rotation.

15. The external apparatus of claim 7, further comprising:

one or more external joints, joint guides, hinges, or any combination thereof, located to stabilize joint rotation, provide a structural connection between separate body support equipment elements, or any combination thereof.

16. The external apparatus of claim 7, wherein:

the controller means includes a reporting means for reporting the current positions of the actuation means.

17. The external apparatus of claim 16, wherein:

the controller means operatively connects to and monitors the reporting means for adjusting the position of, the tension upon, or any combination thereof, the body control elements.

18. The external apparatus of claim 7, wherein:

the body control elements can be used for bodies of different sizes.

19. The external apparatus of claim 7, wherein:

the external apparatus can be automatically configured or the external apparatus can be configured through a computer user interface to effectively match a particular body.

20. The external apparatus of claim 7, wherein:

any combination of the body control elements can be automatically adjusted for comfort or precision.

21. A device for directing the actions of a plurality of joints or limbs, or combination thereof, of organic, mechanical or virtual bodies, comprising:

a first joint control means for the control of joint dynamics on a first body;

a second joint control means for the control of joint dynamics of a second body;

a reporting means for reporting the joint dynamics of the first body or the second body, or a combination thereof; and a computing means operatively connected to said first joint control means and said second joint control means; whereby the second body reflects some or all of the actions of the first body, the first body may be enforced to be essentially in agreement with some or all of the actual joint dynamics of the second body, and the first body may experience some or all of the second body's actions and environment.

22. The device of claim 21, wherein:

said first joint control means, or said second joint control means, or a combination thereof, include a physical joint manipulation mechanism.

23. The device of claim 21, wherein:

At least one of said joint control means control the joints of a virtual body in a virtual environment.

24. The device of claim 21, wherein:

said joint dynamics comprise the position, pressure, speed of movement, true velocity, direction of movement, or attitude, or any combination thereof, of or upon a joint.

25. The device of claim 21, wherein:

the second body attempts to emulate the joint dynamics of the first body and computing means directs the first body to reflect some or all of the resulting joint dynamics of the first body.

26. The device of claim 21, wherein:

said computing means directs the second body to emulate at least one of said joint dynamics of the first body.

27. The device of claim 21, wherein:

said computing means directs the first body to emulate at least one of said joint dynamics of the second body.

28. The device of claim 21, wherein:

said reporting means includes physical sensory devices for reporting said joint dynamics of organic or mechanical joints.

29. The device of claim 21, wherein:

said reporting means includes a virtual means for reporting virtual joint dynamics.

30. The device of claim 21, wherein:

said computing means is a single processor.

31. The device of claim 21, wherein:

said computing means includes a plurality of processors in the same location or in different locations, or a combination thereof, linked by a communication means.

32. The device of claim 31, wherein:

body dynamics, consisting of the joint dynamics of one or more joints, or limb dynamics, derived for a limb or limbs from the joint dynamics of nearby joints, or any combination thereof, as monitored through reporting means by computing means, are used by computing means to maintain a congruity between the body attitudes of the first and second bodies.

33. The device of claim 21, wherein reporting means includes a sensor means, operatively connected to said computing means and mounted directly to, or in effective proximity to, body parts, joint control means, or a combination thereof for one of or both bodies, for measuring joint dynamics, body dynamics consisting of the joint dynamics of one or more joints, or limb dynamics derived for a limb or limbs from the joint dynamics of nearby joints, or any combination thereof.

34. The device of claim 21, wherein:

said joint dynamics, body dynamics and limb dynamics include at least one of attitude, position, acceleration, speed, velocity, or pressure.

35. The device of claim 21, wherein:

said computing means monitors said sensor means measurements, said computing means then uses said sensor means measurements to cause (A) the second body to attempt to emulate the joint dynamics, the body dynamics, or the limb dynamics, or any combination thereof, of the first body, and (B) the first body to attempt to emulate the joint dynamics, the body dynamics, or the limb dynamics, or any combination thereof, of the second body; whereby the joint dynamics, body dynamics, or limb dynamics, or any combination thereof, of the two bodies become or remain essentially synchronized.

36. The device of claim 21, further comprising:

an image capture means for capturing an image; and an image display means for displaying said images captured by said image capture means; whereby because the heads of the two bodies maintain similar or identical attitudes causing the attitude of the image displayed on the image display means to essentially coincide with attitude of the head with the image display means and the head with the image capture means.

37. The device of claim 36, wherein:

a plurality of said image capture means capture images from positions on or near the head of one body and a plurality of said image display means are congruently arrayed on or near the head of the other body.

38. The device of claim 36, wherein:
said image capture means captures an image from the perspective of a single view.

39. The device of claim 36, wherein:
said image capture means includes video cameras or holographic devices or any combination thereof.

40. The device of claim 36, wherein:
said image capture means is capable of providing a transmittable image for transmission between the two bodies.

41. The device of claim 36, wherein:
said image capture means is stereoscopic.

42. The device of claim 36, wherein:
said image display means is operatively connected to said image capture means.

43. The device of claim 36, wherein:
said image display means provides separate images such that a stereoscopic image is formed.

44. The device of claim 36, wherein:
said image display means provides a single image such that a single landscape image is formed.

45. The device of claim 21, wherein:
said computing means applies pressure upon a plurality of first body joints responsive to current pressure on a plurality of second body joints or said computing means applies pressure upon a plurality of second body joints responsive to current pressure on a plurality of first body joints, or any combination thereof; whereby
the first body experiences a resistance pressure related to burdens or resistances being experienced by the second body and/or the second body forces to be exerted can be modified by the actions of the first body.

46. The device of claim 21, wherein:
said computing means manages a plurality of joints simultaneously, causing groups of joints or the entire body to respond or act in a coordinated manner and have a predictable multi-limb position or a predictable full-body position.

47. The device of claim 21, wherein:
said computing means processes changes to the joint dynamics essentially in real time or with respect to some shared time-frame.

48. The device of claim 21, wherein:
said computer means proportionately scales or adjusts a plurality of data relating to the first body and the second body that are different in size; whereby
said device is effective even when there are substantial disparities between the sizes of the first body and the second body which also allows one body to easily direct the actions of a very small or very large body.

49. The device of claim 21, further comprising:
a means for communicating sound between the two bodies; and
a sound sensor means, operatively connected to the sound communication means, is attached to the second body and said sound sensor means effectively moves with the second body such that a captured sound signal is relative to a position of the second body in the environment of the second body; and
a sound reproducing means attached to the first body, operatively connected to said means for communicating sound receives said captured sound signal from the sound sensor means of the second body, then reproduces those sounds such that the first body sound reproduction is effectively relative to the corresponding locations of the sound sensor means on the second body; whereby
the sound reproduced at the first body location is directionally reflective of the sound that originated in the environment of the second body.

50. The device of claim 21, wherein:
said computing means uses the joint dynamics reported by said first reporting means to determine a first plurality of forces on the first body that are not desirable reflections of some or all of a second plurality of forces on the second body, said computing means then directs said first joint control means to exert a third plurality of forces to offset the undesirable portions of the forces on the first body; whereby
the first body can be aided such that the first body can move more freely while feeling less or none of the forces above and beyond the forces of the second body.

51. A method for providing physical assistance with the undesirable burdens on a body, comprising the steps of:
(a) obtaining a plurality of dynamics measurements from the body;
(b) calculating an amount of the undesired burden upon a body part from the dynamics measurements or a plurality of known data, or any combination thereof;
(c) calculating an amount of force, or an amount of movement, or a combination thereof, to offset some or all of said amount of the undesirable burdens on a body; and
(d) directing a plurality of equipment worn by the body to apply a calculated amount of force, or attempt a calculated amount of movement, or a combination thereof.

52. A method according to claim 51, wherein: the undesirable burdens include the weight of any burden borne by the body, the weight of the body itself, or the weight of the equipment worn, or any combination thereof.

53. A method according to claim 51, wherein:
said plurality of known data includes the weight of the equipment worn by the body or the weight of the limbs of the body, any other burden of weight borne by the body, or any combination thereof.

54. A method according to claim 51, wherein:
a plurality of sensor information includes a plurality of sensor readings, or a plurality of joint dynamics measurements, or any combination thereof.

55. A device allowing physical bodies to direct the actions of virtual bodies and physically experience a potentially complex virtual environment, comprising;
a first joint control means for controlling the joint dynamics of a first body;
a first reporting means for reporting the joint dynamics of the first body;
a means for providing a virtual reality environment in which a virtual body exists that essentially emulates the first body;
a second reporting means for reporting the joint dynamics of said virtual body;
a second joint control means for controlling the joint dynamics of said virtual body;
a computing means operatively connected to said first joint control means, said second joint control means, said first reporting means, and said second reporting means; whereby the virtual body reflects the actions of the first body, the first body may be enforced to be essentially in agreement with some or all of the actual accomplished joint dynamics of the virtual body, and the first body may experience sensations from the actions of the virtual body and virtual body environment which can be used to create a complex simulation without a physical set of objects, since the objects encountered can all be virtual.

56. The device of claim 55, wherein:

said joint dynamics comprise the position, pressure upon, speed of movement, velocity, angle, or direction of movement, or any combination thereof, of a joint or the body part controlled by the joint, or any combination thereof.

57. The device of claim 55, wherein:

said means for providing a virtual reality environment includes a processor means incorporating a set of software instructions which includes said second reporting means and said second joint control means.

58. The device of claim 55, wherein:

said computing means monitors said first and second reporting means and directs said virtual body to attempt to emulate at least one of said plurality of joint dynamics of the first body.

59. The device of claim 55, wherein:

said computing means monitors said first and second reporting means and directs said first body to emulate at least one of said joint dynamics of the second body.

60. The device of claim 55, further comprising:

a means for perceiving sound;

a means for communicating sound between the two bodies;

a virtual sound sensor means, operatively connected to the sound communication means, is attached to the virtual body and said virtual sound sensor means effectively moves with the virtual body such that a captured sound signal is relative to a position of the virtual body in the virtual environment;

a sound reproducing means attached to the first body, operatively connected to said means for communicating sound, receives said captured sound signal from the virtual sound sensor means of the virtual body, then reproduces the perception of those sounds such that the first body sound reproduction is effectively located relative to the corresponding locations of the virtual sound sensor means on the virtual body; whereby the sound reproduced at the first body location is directionally reflective of the sound that originated in the virtual environment of the virtual body.

61. The device of claim 55, further comprising:

a means for sensing temperature;

a means for communicating sensed temperature between the two bodies;

a virtual temperature sensor means, operatively connected to the temperature communication means, is attached to the virtual body, said virtual temperature sensor means senses virtual temperatures effectively felt by the virtual body in the virtual environment;

a temperature reproducing means attached to the first body, operatively connected to said means for communicating sensed temperature, receives the captured virtual temperature from the virtual temperature sensor means of the virtual body, then reproduces the physical perception of these temperatures on the first body such that the first body effectively feels the corresponding temperatures of the virtual body; whereby the temperature reproduced at the first body location is reflective of the position and the temperature that originated in the virtual environment of the virtual body.

62. An apparatus for the capture and reproduction of vibration signals for the purpose of communicating the sense of touch, comprising:

a sensing means on a first body made up of a plurality of vibration sensitive elements;

a reproductive means arrayed on a second body, said reproductive means reproduces a plurality of signals from said sensing means on the first body;

a communication means operatively connected to said sensing means and said reproductive means for carrying the signals or data from said sensing means to said reproductive means either directly or by recorded delay; whereby a sound, pressure, or impact encountered, or any combination thereof by the first body can be sensed at a congruent point on the second body providing a proper sense of location and feel of the contact even when the first body is far from the second body and connected by any form of communication link.

63. The apparatus in claim 62, wherein:

said plurality of vibration sensitive elements produce variations in a carried signal relative to pressure, impact, or vibration, or any combination thereof.

64. The apparatus in claim 62, wherein:

said reproductive means is configured on the second body in essentially the same layout as said sensing means on the first body.

65. An apparatus for the capture and reproduction of heat signals for the purpose of communicating the sense of temperature, comprising:

a sensing means comprising a plurality of temperature sensitive elements associated with a first body;

a reproductive means arrayed on or near a second body in a layout similar to the placement of said sensing means on the first body for effecting changes in temperature on the second body responsive to a plurality of signals or data from said sensing means;

a communications means operatively connected to said sensing means and said reproductive means for carrying the signals or data from said sensing means to said reproductive means either directly or by recorded delay; whereby the second body can sense the temperatures and temperature fluctuations experienced on the first body on the appropriate locations of the second body for a natural sense of the first body's experience.

66. A device for easily adjusting the balance or weight, or any combination thereof, of robotics equipment comprising:

a center of gravity adjustment means comprising weights associated with a plurality of skeletal elements which can be fixed at different points along the length of the skeletal elements; whereby skeletal members of a robot can be modified to match a desired weight, or balance, or both, or be adjusted to have a desired set of balancing characteristics, or any combination thereof, to tune the precision and usefulness of robotics operations without the requirement of redesign or dismantlement.

67. The device of claim 66 further comprising:

a plurality of adjustable length skeletal elements;

an actuation means operatively connected to said adjustable length skeletal elements, or said center of gravity adjustment means, or any combination thereof, for adjusting them;

a computing means for directing the positional control of said adjustable length skeletal elements, or said center of gravity adjustment means, or any combination thereof;

a sensory means operatively connected to said computing means for reporting the positions of said adjustable length skeletal elements and said center of gravity adjustment means, allowing said computer means to accurately set them; whereby even very complex robotic assemblies can be rapidly computer-adjusted or adjusted by humans with the aid of a computer interface without redesign or disassembly to be balanced, sized or both to match an ideal design or configuration with that process potentially completely automated when the desired body attributes are known, retrievable or sensed on a body to be emulated.

68. A device for allowing a body to operate in a controlled, virtual or customized environment, comprising:

a plurality of body control equipment for controlling the motion and positions of a body, or providing desired forces upon the body, or a combination thereof;

an interactive virtual reality means operatively connected to said body control equipment for providing haptic response to the body control equipment reflective of objects and actions in the virtual world, or for causing a virtual body to emulate the actions of the body wearing said body control equipment, or any combination thereof;

a motion control means connected to and supporting the body control equipment for providing pitch control, roll control, yaw control, or horizontal motion control, or any combination thereof, to the body; whereby the body can experience an environment with a potentially limitless range of perceived travel or activity without ever moving beyond a limited physical area which is applicable to full-immersion virtual reality where the user feels and interacts with and climbs upon a virtual environment which requires no physical simulation room or props to be constructed, fall-proof and computer guided physical therapy, remote control of robotics where the person controlling the remote robotic feels the experience, joint dynamics, and body attitudes of the remote robot, or any application requiring spatial body control.

* * * * *